(12) United States Patent
Ahmavaara et al.

(10) Patent No.: US 10,764,798 B2
(45) Date of Patent: Sep. 1, 2020

(54) DISCOVERY OF NEIGHBOR RADIO ACCESS SYSTEMS BY A USER MOBILE COMMUNICATIONS DEVICE SERVICED BY A RADIO ACCESS NETWORK (RAN) FOR REPORTING DISCOVERED SYSTEMS TO A SERVING SYSTEM IN THE RAN

(71) Applicant: Corning Optical Communications LLC, Charlotte, NC (US)

(72) Inventors: Kalle Ahmavaara, San Diego, CA (US); Hithesh Nama, Los Altos, CA (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 15/815,248

(22) Filed: Nov. 16, 2017

(65) Prior Publication Data

US 2018/0139666 A1 May 17, 2018

Related U.S. Application Data

(60) Provisional application No. 62/423,070, filed on Nov. 16, 2016.

(51) Int. Cl.
*H04W 36/00* (2009.01)
*H04W 24/10* (2009.01)
(Continued)

(52) U.S. Cl.
CPC ....... *H04W 36/0088* (2013.01); *H04W 24/10* (2013.01); *H04W 36/0066* (2013.01);
(Continued)

(58) Field of Classification Search
CPC ..... H04W 48/18; H04W 48/16; H04W 16/14; H04W 16/32; H04W 36/0009;
(Continued)

(56) References Cited

U.S. PATENT DOCUMENTS 4,099,137 A * 7/1978 Alm, Jr. ............... G01S 7/28
330/149
9,271,278 B2 2/2016 Heo et al.
(Continued)

OTHER PUBLICATIONS

Non-Final Office Action for U.S. Appl. No. 16/665,763, dated Jun. 1, 2018, 9 pages.
(Continued)

*Primary Examiner* — Joseph Arevalo
(74) *Attorney, Agent, or Firm* — C. Keith Montgomery

(57) ABSTRACT

Discovery of a neighbor radio access system by a user mobile communications device serviced in a radio access network (RAN) for reporting to a serving system in the RAN. User mobile communications device serviced by a RAN is configured to scan one or more frequency ranges (e.g., bands) to discover other neighbor radio access systems. This is opposed to, for example, the user mobile communications device only searching for transmitted communications signals at specific center frequency (e.g., an EARFCN). There may be other radio access systems that operate neighbor cells and in other frequency bands in proximity the RAN serving the user mobile communications device. Discovered neighboring radio access systems can be reported by the user mobile communications device to its serving RAN in a measurement report, which can then be used by the serving RAN for other functionalities, such as trigger handovers of user mobile communications device for example.

46 Claims, 17 Drawing Sheets

(51) Int. Cl.
*H04W 76/27* (2018.01)
*H04W 16/14* (2009.01)
*H04W 36/14* (2009.01)
*H04W 48/16* (2009.01)

(52) U.S. Cl.
CPC ....... *H04W 36/0094* (2013.01); *H04W 76/27* (2018.02); *H04W 16/14* (2013.01); *H04W 36/00835* (2018.08); *H04W 36/14* (2013.01); *H04W 48/16* (2013.01)

(58) Field of Classification Search
CPC ..... H04W 36/04; H04W 36/32; H04W 72/04; H04W 84/18; H04W 8/005; H04W 12/04; H04W 16/04
USPC ............ 455/437, 436, 434, 444, 424, 452.2, 455/422.1, 435.3, 552.1, 509, 41.2, 525, 455/127.2, 62, 226.1, 507, 41.7, 448, 450, 455/443
See application file for complete search history.

(56) References Cited

U.S. PATENT DOCUMENTS

| | | | |
|---|---|---|---|
| 9,544,761 | B2 | 1/2017 | Nama et al. |
| 2008/0200202 | A1 | 8/2008 | Montojo et al. |
| 2010/0034135 | A1 | 2/2010 | Kim et al. |
| 2011/0170517 | A1 | 7/2011 | Bakker et al. |
| 2011/0194630 | A1 | 8/2011 | Yang et al. |
| 2011/0244869 | A1* | 10/2011 | Olofsson ............... H04W 24/02 455/442 |
| 2012/0140660 | A1 | 6/2012 | Kang et al. |
| 2012/0176996 | A1 | 7/2012 | Kim et al. |
| 2013/0203350 | A1* | 8/2013 | Etchegoyen ............ H04B 5/02 455/41.1 |
| 2014/0010171 | A1* | 1/2014 | Morrill ................. H04W 88/10 370/329 |
| 2014/0066055 | A1* | 3/2014 | Balakrishnan ........ H04W 36/14 455/432.1 |
| 2014/0126438 | A1 | 5/2014 | Zhu et al. |
| 2014/0301371 | A1* | 10/2014 | Maeda .................. H04W 76/10 370/331 |
| 2015/0011219 | A1 | 1/2015 | Sally et al. |
| 2015/0373628 | A1 | 12/2015 | Hwang et al. |
| 2016/0014626 | A1 | 1/2016 | Yi et al. |
| 2016/0037406 | A1 | 2/2016 | Centonza et al. |
| 2016/0190707 | A1 | 6/2016 | Park et al. |
| 2016/0205534 | A1* | 7/2016 | Fujishiro ............. H04W 72/048 455/434 |
| 2016/0212624 | A1 | 7/2016 | Mueck et al. |
| 2016/0286449 | A1 | 9/2016 | Choi et al. |
| 2016/0295613 | A1 | 10/2016 | Wager et al. |
| 2017/0070312 | A1* | 3/2017 | Yi ........................ H04J 11/0069 |
| 2017/0188241 | A1 | 6/2017 | Mueck et al. |
| 2017/0195887 | A1 | 7/2017 | Jovancevic |
| 2017/0208454 | A1 | 7/2017 | Knisely et al. |
| 2017/0289960 | A1* | 10/2017 | Moustafa .................. H04L 5/14 |
| 2017/0295497 | A1 | 10/2017 | MacMullan et al. |
| 2017/0318470 | A1 | 11/2017 | Srikanteswara et al. |
| 2017/0331447 | A1* | 11/2017 | Lee ........................... H03H 7/40 |
| 2018/0054237 | A1* | 2/2018 | Tseng .................. H04W 72/085 |
| 2018/0132111 | A1 | 5/2018 | Mueck et al. |
| 2018/0146380 | A1 | 5/2018 | Srikanteswara et al. |
| 2018/0270721 | A1 | 9/2018 | Cui et al. |

OTHER PUBLICATIONS

Non-Final Office Action for U.S. Appl. No. 13/752,358, dated Jan. 15, 2015, 21 pages.
Non-Final Office Action for U.S. Appl. No. 13/752,358, dated Jul. 29, 2015, 30 pages.
Final Office Action for U.S. Appl. No. 13/752,358, dated Mar. 31, 2016, 21 pages.
Notice of Allowance and Examiner-Initiated Interview Summary for U.S. Appl. No. 13/752,358, dated Aug. 31, 2016, 11 pages.
Author Unknown, "Technical Specification Group Radio Access Network; Evolved Universal Terrestrial Radio Access (E-UTRA); Radio Resource Control (RRC); Protocol specification (Release 14)," Technical Specification 36.331, Version 143.0, Jun. 2017, 3GPP Organizational Partners, 745 pages.
Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Technical Specification 36.300, Version 13.4.0, 3GPP Organizational Partners, Jun. 2016, 310 pages.
Final Office Action for U.S. Appl. No. 15/665,763, dated Oct. 9, 2018, 11 pages.
Advisory Action for U.S. Appl. No. 15/665,763, dated Dec. 31, 2018, 4 pages.
Non-Final Office Action for U.S. Appl. No. 15/665,763, dated Mar. 1, 2019, 11 pages.
Notice of Allowance for U.S. Appl. No. 15/665,763, dated Jul. 17, 2019, 8 pages.

* cited by examiner

RRCConnectionReconfiguration MESSAGE (600)

```
-- ASN1START
RRCConectionReconfiguration ::=            SEQUENCE {
    rrc-TransactionIdentifier              RRC-TransactionIdentifier
    criticalExtensions                     CHOICE {
        c1                                 CHOICE {
            rrcConnectionReconfiguration-r8    RRCConnectionReconfiguration-r8-IEs
            spare7 NULL
            spare6 NULL, spare 5 NULL, spare4 NULL,
            spare3 NULL, spare2 NULL, spare1 NULL
        },
        criticalExtensionsFuture           SEQUENCE { }
    }
}

RRCConectionReconfiguration-r8-IEs ::= SEQUENCE {   /—602
        measConfig                  MeasConfig              OPTIONAL,  -- Need
ON
        mobilityControlInfo         MobilityControlInfo     OPTIONAL,  -- Cond
HO
        dedicatedinfoNASList        SEQUENCE (SIZE(1..maxDRB)) OF
                                    DedicatedinfoNAS        OPTIONAL,  -- Cond
nonHO
        radioResourceConfigDedicated  RadioResourceConfigDedicated  OPTIONAL,  -- Cond
HO-toEUTRA
        securityConfigHO            SecurityConfigHO        OPTIONAL,  -- Cond
HO
        nonCriticalExtension        RRCConnectionReconfiguration-v890-IEs    OPTIONAL
}
RRCConectionReconfiguration-v890-IE# ::= SEQUENCE {
        lateNonCriticalExtension    OCTET STRING (CONTAINING
RRCConectionReconfiguration-v8m0-IEs)    OPTIONAL,
        nonCriticalExtension        RRConnectionReconfiguration-V920-IEs    OPTIONAL
}
-- Late non-critical extensions:
RRCConnectionReconfiguration-v9m0-IEs ::= SEQUENCE {
        -- Following field is only for pre REL-10 late non-critical extions
        lateNonCriticalExtension    OCTET STRING           OPTIONAL,
        nonCriticalExtension        RRCConnectionReconfiguration-v10i0-IEs
        OPTIONAL
}
```

FIG. 6A

INFORMATION ELEMENT MeasConfig (602)

```
-- ASN1START

MeasConfig ::=                    SEQUENCE {
    --Measurement objects
    measObjectToRemoveList            MeasObjectToRemoveList                      OPTIONAL, --
Need ON                                                              -604
    measObjectToAddModList            MeasObjectToAddModList                      OPTIONAL, --
Need ON
    -- Reporting configurations
    reportConfigToRemoveList          ReportConfigToRemoveList                    OPTIONAL, --
Need ON
    reportConfigToAddModList          ReportConfigToAddModList                    OPTIONAL, --
Need ON
    -- Measurement identities
    measIdToRemoveList                MeasIdToRemoveList                          OPTIONAL, --
Need ON
    measIdToAddModList                MeasIdToAddModList                          OPTIONAL, --
Need ON
    -- Other parameters
    quantityConfig                    QuantityConfig                              OPTIONAL, --
Need ON
    measGapConfig                     MeasGapConfig                               OPTIONAL, --
Need ON
    s-Measure                         RSRP-Range                                  OPTIONAL, --
Need ON
    preRegistrationInfoHRPD           PreRegistrationInfoHRPD                     OPTIONAL, --
Need OF
    speedStatePars            CHOICE {
        release                               NULL,
        setup                                 SEQUENCE
            mobilityStateParameters               MobilityStateParameters,
            timeToTrigger-SF                      SpeedStateScaleFactors
        }                                                                         OPTIONAL, --
    }
Need ON ...,
    {{ measObjectToAddModLIst-v9e0    MeasObjectToAddModList-v9e0                 OPTIONAL, --
```

*FIG. 6B*

INFORMATION ELEMENT MeasObjectToAddModList (604)

```
-- ASN1START
MeasObjectToAddModList ::=           SEQUENCE (SIZE (1..maxObjectId)) OF MeasObjectToAddMod
MeasObjectToAddModListExt-r13 ::=    SEQUENCE (SIZE (1..maxObjectId)) OF
MeasObjectToAddModExt-r13 ::=
MeasObjectToAddModList-v9e0 ::=      SEQUENCE (SIZE (1..maxObjectId)) OF MeasObjectToAddMod-
v9e0
    MeasObjectToAddMod ::= SEQUENCE {
        measObjectId              MeasObjectId,
        measObject                CHOICE {               ⁓606
            measObjectEUTRA           MeasObjectEUTRA,
            measObjectUTRA            MeasObjectUTRA,
            measObjectGERAN           MeasObjectGERAN,
            measObjectCDMA2000        MeasObjectCDMA2000,
            ...,
            measObjectWLAN-r13        MeasObjectWLAN-r13
        }
}

MeasObjectToAddModExt-r13 ::=     SEQUENCE {
        measObjectId-r13              MeasObjectId-v1310,
        measObject-r13                CHOICE {
            measObjectEUTRA-r13           MeasObjectEUTRA,
            measObjectUTRA-r13            MeasObjectUTRA,
            measObjectGERAN-r13           MeasObjectGERAN,
            measObjectCDMA2000-r13        MeasObjectCDMA2000,
            ...,
            measObjectWLAN-v1320          MeasObjectWLAN-r13
        }
}
```

FIG. 6C

INFORMATION ELEMENT MeasObjectEUTRA (606)

```
-- ASN1START
MeasObjectEUTRA ::=        SEQUENCE          608
    carrierFreq                   ARFCN-ValueEUTRA,
    allowedMeasBandwidth          AllowedMeasBandwidth,
    PresenceAntennaPort1          PresenceAntennaPort1,
    neighCellConfig               NeighCellConfig,
    offsetFreq                    Q-OffsetRange               DEFAULT dB0,
    -- Cell List
    cellsToRemoveList             CellIndexList               OPTIONAL,    -- Need ON
    cellsToAddModList             CellsToAddModList           OPTIONAL,    -- Need ON.
    -- Black List
    blackCellsToRemoveList        CellIndexList               OPTIONAL,    -- Need ON
    blackCellsToAddModList        BlackCellsToAddModList      OPTIONAL,    --Need ON
    cellForWhichToReportCGI       PhysCellId                  OPTIONAL,    --Need ON
    [[ measCycleSCell-r10            MeasCycleSCell-r10       OPTIONAL,    --Need ON
       measSubframePatternConfigNeigh-r10 MeasSubframePatternConfigNeigh-r-10 OPTIONAL
    ]],
    [[ widebandRSSQ-Meas-r11         BOOLEAN OPTIONAL         -- Cond WB-RSRO
       altTTT-CellsToRemoveList-r12 CellIndexList             OPTIONAL,    -- Need ON
       altTTT-CellsToAddModList-r12 AltTTT-CellsToAddModList-r12          OPTIONAL,  -- Need ON
       t312-r12                      Choice {
                          release    NULL,
                          setup      ENUMERATED (ms0, ms50, ms100, ms200,
                                     ms300, ms400, ms500, ms1000)
                       }                                      OPTIONAL,    -- Need ON
       reducedMeasPerformance-r12 BOOLEAN                     OPTIONAL,    -- Need ON
       measDS-Config-r12             MeasDS-Config-r12        OPTIONAL     -- Need ON
    ]],
    [[ whiteCellsToRemoveList-r13  CellIndexList              OPTIONAL,    -- Need On
       whiteCellsToAddModList-r13  WhiteCellsToAddModList-r13 OPTIONAL,    -- Need ON
       rmtc-Config-r13             RMTC-Config-r13            OPTIONAL     -- Need ON
       carrierFreq-r13             ARFCN-ValueEUTRA-v9e0      OPTIONAL     -- Need ON
    ]],
    [[ tx-ResourcePoolToRemoveList-r14  Tx-ResourcePoolMeasList-r14       OPTIONAL,  -- Need ON
       tx-ResourcePoolToAddList-r14     Tx-ResourcePoolMeasList-r14       OPTIONAL,  -- Need ON
```

FIG. 6D

MeasurementReport MESSAGE (700)

```
-- ASN1START

MeasurementReport ::=        SEQUENCE {
    criticalExtensions           CHOICE {
        c1                           CHOICE {
            measurementReport-r8         MeasurementReport-r8-IEs,
            spare7 NULL,
            spare6 NULL, spare5 NULL, spare4 NULL,
            spare3 NULL, spare2 NULL, spare1 NULL
        },
        criticalExtensionsFuture     SEQUENCE { }
    }
}

MeasurementReport-r8-IEs ::= SEQUENCE {        702
    measResults                  MeasResults,
    nonCriticalExtension         MeasurementReport-v8a0-IEs     OPTIONAL
}

MeasurementReport-v8a0-IEs ::= SEQUENCE {
    lateNonCriticalExtension     OCTET STRING     OPTIONAL,
    nonCriticalExtension         SEQUENCE { }     OPTIONAL
}

-- ASN1STOP
```

FIG. 7A

INFORMATION ELEMENT MeasResults (702)

```
-- ASN1START
MeasResults ::=                     SEQUENCE {        /704
    measId                              MeasId,
    measResultPCell                     SEQUENCE {
        rsrpResult                          RSRP-RANGE,
        rsrpResult                          RSRQ-RANGE
    },
    measResultNeighCells                CHOICE {
        measResultListEUTRA                 measResultListEUTRA
        measResultListUTRA                  measResultListUTRA
        measResultListGERAN                 measResultListGERAN
        measResultsCDMA2000                 measResultsCDMA2000
        ...
    }                                                                   OPTIONAL,
    ...,
    measReslutForECID-r9                measReslutForECID-r9            OPTIONAL
    ]],
    [[      locationInfo-r10                LocationInfo-r10            OPTIONAL,
            measResultServFreqList-r10      MeasResultServFreqList-r10  OPTIONAL
    ]],
    [[      measId-v1250                    MeasId-v1250                OPTIONAL,
            measResultPcell-v1250           MeasResultPcell-v1250       OPTIONAL,
            measResultCSI-RS-List-r12       MeasResultCSI-RS-List-r12   OPTIONAL
    ]],
    [[      measResultForRSSI-r13           MeasResultForRSSI-r13       OPTIONAL,
            measResultServFreqListExt-r13   MeasResultServFreqListExt-r13 OPTIONAL,
            measResultSSTD-r13              MeasResultSSTD-r13          OPTIONAL,
            measResultPCell-v1310           SEQUENCE {
                rs-sint-Result-r13              RS-SINR-Range-r13
            )                                                           OPTIONAL,
            ul-PDCP-DelayResultList-r13     Ul-PDCP-DelayResultList-r13 OPTIONAL,
            measResultListWLAN-r13          MeasResultListWLAN-r13      OPTIONAL
    ]],
    [[      measResultPCell-v1360           RSRP-RANGE-v1360            OPTIONAL
    ]],
    [[      measResultListCBR-r14           MeasResultListCBR-r14       OPTIONAL,
            measResultListWLAN-r14          MeasResultListWLAN-r14      OPTIONAL
    ]]
}
```

*FIG. 7B*

INFORMATION ELEMENT MeasId (704)

```
-- ASN1START                                              706
MeasId ::=              INTEGER (1.. maxMeasId)
MeasId-v1250 ::=        INTEGER (maxMeasId-Plus1..maxMeasId-r12)
-- ASN1STOP
```

*FIG. 7C*

DISCOVERY OF NEIGHBOR RADIO ACCESS SYSTEMS BY A USER MOBILE COMMUNICATIONS DEVICE SERVICED BY A RADIO ACCESS NETWORK (RAN) FOR REPORTING DISCOVERED SYSTEMS TO A SERVING SYSTEM IN THE RAN

PRIORITY APPLICATION

The present application claims priority under 35 U.S.C. § 119(e) to U.S. Provisional Patent Application Ser. No. 62/423,070 entitled "SYSTEM AND METHOD FOR MOBILITY RELATED TO SHARED SPECTRUM SYSTEMS" and filed on Nov. 16, 2016, which is incorporated herein by reference in its entirety.

RELATED APPLICATIONS

The present application is related to U.S. patent application Ser. No. 15/665,763 entitled "SYSTEM AND METHOD FOR CBRS DUAL CELL RADIO NODE" and filed on Aug. 1, 2017, which is incorporated herein by reference in its entirety.

The present application is also related to U.S. Pat. No. 9,544,761 entitled "USE OF A COMMON PHYSICAL CELL IDENTITY IN A SMALL CELL NETWORK" and filed on Jan. 28, 2013, which is incorporated herein by reference in its entirety.

BACKGROUND

The disclosure relates generally to mobile communications systems and related networks, such as Universal Mobile Telecommunications Systems (UMTSs), its offspring Long Term Evolution (LTE) and $5^{th}$ Generation New Radio (5G-NR) described and being developed by the Third Generation Partnership Project (3GPP), and more particularly to radio access networks (RANs) and user mobile communication devices connecting thereto, including small cell RANs, implemented in such mobile communications systems.

Operators of mobile systems, such as UMTS and its offspring including LTE and LTE-Advanced, are increasingly relying on wireless small cell RANs in order to deploy for example indoor voice and data services to enterprises and other customers. Such small cell RANs typically utilize multiple-access technologies capable of supporting communications with multiple users using radio frequency (RF) signals and sharing available system resources such as bandwidth and transmit power. Evolved universal terrestrial radio access (E-UTRA) is the radio interface of 3GPP's LTE upgrade path for UMTS mobile networks. In these systems, there are different frequencies where LTE (or E-UTRA) can be used, and in such systems, user mobile communications devices connect to a serving system, which is represented by a cell. In LTE, each cell is produced by a node called eNodeB (eNB).

A general principle in LTE or E-UTRA system is that a serving system (e.g., an eNB in such system) provides a measurement configuration to the mobile communications devices to "point" the receiver of the user mobile communications device to find other systems (e.g., neighbor cells) transmitting at a specified frequency(ies) (e.g., at 1900 MHz, 2522.375 MHz, etc) according to the measurement configuration that the user mobile communications device should measure. The measurement of communications signals of other systems by the user mobile communications device at specified frequencies is performed for variety of purposes, including inter frequency mobility and inter-frequency measurements. The user mobile communications devices can find these communications systems and perform actions, such as cell reselection in the idle mode and sending of measurement reports (e.g., Measurement Report Messages (MRMs)) in the active mode. These measurement reports can be used by the serving system to, for example, trigger handovers or to gather information about neighbor cells through Automatic Neighbor Relation (ANR) discovery. For example, a serving system of a mobile network operation (MNO) may use the MRMs for selecting handover targets for user mobile communications devices, to cause the user mobile communications devices to be serviced by a different cell for optimizing communications. For idle mode user mobile communication devices, this measurement configuration information may be delivered in a System Information broadcast, which is used by the eNB to indicate, point out, and/or determine systems and frequencies in the pertinent area and in particular to indicate to the user mobile communications devices the appropriate measurement configuration parameters. For active mode user mobile communication devices, this measurement configuration information may be delivered in user mobile communications device-specific radio resource control (RRC) signaling messages, and in particular in RRC messages that indicate to the user mobile communications devices the appropriate measurement configuration parameters. In these measurement configuration parameters, there are specific instructions about what frequencies the user mobile communications device should measure. The information discovered by the user mobile communications devices buy performing such measurements may then be reported back to the serving system or used for initiating mobility functions.

As part inter frequency measurement process, the frequencies to which a serving system instructs a user mobile communications device to point to are indicated by the specific center frequency, or more particularly the E-UTRA Absolute Radio Frequency Channel Number (EARFCN). The EARFCN is an integer number that points to a specific carrier frequency of interest (e.g., 1825,375 GHz). Being that the EARFCN represents a specific center frequency, it is easy for a user mobile communications device to tune its receiver to that frequency and determine if there are any other communications systems transmitting on that frequency in the surrounding area of the user mobile communications device. In many situations a user mobile communications device is not performing measurements on any other frequencies than the specific EARFCNs provided to the user mobile communication device by the serving RAN. A MNO can easily configure its serving systems with the desired EARFCNs to communicate to a user mobile communications device as part of inter frequency measurement process, because MNO will know the exact frequency spectrum (i.e., bands) of other potential neighbor cells as they typically do belong to the same MNO in the mobile communications network of the serving system. Such frequency bands are typically licensed to that particular MNO, namely to the same MNO who is operating the serving system. The use of specific EARFCNs by each cell in the area is thus knows to the MNO and thus it is generally possible to precicly point the user mobile communication devices to all the specific EARFCNs in which it may find suitable or other cells able to provide service to the user mobile communication device. If "foreign" operations are detected within the MNO's licensed frequency band, the MNO can determine possible misuse of their licensed spectrum.

However, new mobile access systems exist that use spectrum that is independent of a MNO or is not under full control of the MNO in the same way as traditional licensed spectrum may be. Examples of such spectrums include unlicensed spectrum, shared spectrum, spectrum licensed from a third party, spectrum associated with citizens broadband radio service (CBRS), and so on. In these cases, spectrum allocation, or channel allocation, may be performed by a technique or procedures that occur independently or semi-independently of the MNO, such as by Spectrum Allocation System (SAS) for example. As an example, if a CBRS system is operated in a stadium or arena by a third party, the CBRS system may be dynamically assigned a channel, or operating spectrum, by a SAS. Due to this independent and dynamic nature of spectrum allocation, it would be very difficult for all surrounding MNO systems to be constantly aware of all the actual frequencies in which these third party systems were allocated and currently operate on. However, if the third party has a business agreement with a MNO, the third party CBRS network may however be configured to serve user mobile communications devices associated with a specific MNO or a specific set of MNOs. In so doing, the CBRS system is broadcasting the public land mobile network (PLMN) identifications (IDs) (PLMN IDs) of the associated MNOs to enable the user mobile communications device connection. Even with the business relationship between the MNO and the third party operation CBRS systems, the MNO may be completely unaware of the specific frequencies allocated by the SAS to the CBRS system for communications. Even if the third party was made aware of such frequency allocation, this allocation may change dynamically due to steps taken by the CBRS SAS s for frequency optimization or other purposes. For example, if a Navy vessel requires use of the spectrum for radar, frequencies available for a CBRS will be impacted and thus spectrum allocations may be dynamically shifted by a CBRS SAS. Thus, it is difficult and undesirable to have a requirement that each MNO needs to be up to date with a list of employed, allocated frequencies that the systems around them currently use. Requiring such updating would create undesired operational coupling between the third party communications systems and the MNO communications systems.

No admission is made that any reference cited herein constitutes prior art. Applicant expressly reserves the right to challenge the accuracy and pertinency of any cited documents.

SUMMARY

Embodiments of the disclosure relate to discovery of neighbor radio access systems by a user mobile communications device serviced by a radio access network (RAN) for reporting discovered systems to the serving RAN. In this regard, in aspects disclosed herein, a user mobile communications device serviced by a serving RAN is configured to tune its receiver to scan one or more frequency ranges (e.g., bands) based on a scan frequency criteria to discover other neighbor radio access systems in communications range of the user mobile communications device. This is opposed to, for example, the user mobile communications device only searching for transmitted communications signals at specific center frequency, such as for example, using a specific Evolved Universal Terrestrial Radio Access (E-UTRA) Absolute Radio Frequency Channel Number (EARFCN). In this example, the scan frequency criteria does not include solely a pre-known transmission frequency for the one or more neighbor radio access systems. However, note that frequency range based on the scan frequency criteria can include a center transmission frequency (e.g., an EARFCN) of a neighbor radio access system, but is not solely comprised of a center transmission frequency of a neighbor radio access system. For example, the user mobile communications device may be a mobile cellular telephone that is configured to be serviced by a serving system (e.g., a eNodeB cell) in the RAN serving the user mobile communications device ("serving RAN"). The serving RAN may be operated by a mobile network operation (MNO). There may be other radio access systems, such as shared spectrum systems, that operate neighbor cells and in other frequency bands to the serving RAN. For example, such radio access systems may communicate over publicly available frequencies that are unlicensed, such as the citizens broadband radio service (CBRS). These radio access systems may be operated by third parties that are not MNOs. Thus, for example, because the MNOs may be unaware of the specific center frequencies used by these radio access systems, the serving system in the serving RAN may be unaware of what specific frequencies to point the user mobile communications device to discover. In this regard, in aspects disclosed herein, the user mobile communications device can be configured to scan a target frequency band(s) that is less deterministic than a single specific frequency. The target frequency band(s) can be based on based on a scan frequency criteria that includes, for example, a group of EARFCNs, a frequency band, a frequency range, and target band identification (ID) (e.g., a public land mobile network (PLMN) identification (ID) (PLMN ID)) as non-limiting examples. Any neighbor radio access systems discovered by the user mobile communications device according to the scanned frequency band(s) can be reported by the user mobile communications device to the serving system in the serving RAN in a measurement report (e.g., Measurement Report Messages (MRMs)), which can then be used by the serving system to indicate, point out, and/or determine systems and frequencies in the pertinent area. For example, the serving system may use the measurement report information to determine if other RANs of higher priority exist. As an example, measurement reports from the user mobile communications device can be used by the serving RAN to trigger handovers or to gather information about a neighbor radio access system.

As an example, the user mobile communications device may be configured to scan for other RANs in an idle or active communications mode, but only communicate a measurement report to the serving system in an active communications mode. In the active communications mode, measurement report information can be delivered, for example, in a user mobile communications device-specific radio resource control (RRC) signaling messages, and in particular in RRC messages that indicate to the user mobile communications device the appropriate measurement configuration parameters.

In some aspects disclosed herein, the serving system in the serving RAN to the user mobile communications device transmits a measurement configuration message comprising scan frequency criteria to the user mobile communications device used by the user mobile communications device to scan one or more frequency ranges to discover other neighbor radio access systems. In this manner, the user mobile communications device is instructed by the serving system in the serving RAN to scan a frequency range for other neighbor radio access systems rather than doing so unsolicitedly. However, in other aspects, the user mobile communications device may be configured to scan particular frequency ranges to find other neighbor radio access systems in an unsolicited manner without first being instructed through a measurement configuration message from a serving system. The frequency range scanned by the user mobile communications device can be based on a predefined policy programmed in the user mobile communications device. For example, the user mobile communications device may be programmed to scan frequencies in the CBRS band. The user mobile communications device may be configured to unsolicitedly scan for neighbor RANs in an idle communications mode. Subsequently, in either case of solicited or unsolicited scanning, the user mobile communications device can send the measurement reports regarding discovered neighbor radio access systems to the serving RAN to be processed.

In other aspects disclosed herein, the user mobile communications device may apply defined filtering criteria to the frequency band(s) to scan for neighbor radio access systems. In this manner, for example, the entire width of the frequency band(s) to scan does not have to be scanned, to conserve communications resources and reduce latency. A tradeoff can be determined based on the benefit of a more narrow or lower granularity scanning of frequencies in a frequency band versus the usefulness of the additional information obtained by scanning the frequency band at a lower granularity. For example, on certain frequency sub ranges within the frequency band to be scanned may be scanned by the user mobile communications device. As another example, the user mobile communications device can be configured to check the identification (e.g., the PLMN ID) of communications signals discovered within the scanned frequency range to then either include or filter out such discovered radio access systems in the measurement report provided back to the serving RAN.

In yet another aspect disclosed herein, the serving RAN can instruct different sets of serviced user mobile communications devices to perform different types of scanning. For example, the serving RAN may instruct one set of user mobile communications devices to scan for communications signals in larger frequency bands and report the results in measurement reports back to the serving RAN. The serving RAN may then use the measurement reports from the user mobile communications device for larger frequency band scanning to then instruct other user mobile communications device to scan for smaller frequency ranges within discovered frequency ranges reported as having discovered systems and/or at specific frequencies within the discovered frequency ranges.

In one exemplary aspect, a method of discovering neighbor radio access systems to a serving RAN serving a user mobile communications device is provided. The method comprises determining one or more frequency ranges to scan to discover one or more neighbor radio access systems to the serving RAN based on scan frequency criteria that does not comprise a pre-known transmission frequency for the one or more neighbor radio access systems. The method also comprises discovering the presence of the one or more neighbor radio access systems to the serving RAN based on detecting scanned communications signals at one or more center frequencies within the one or more frequency ranges of the one or more neighbor radio access systems.

An additional embodiment of the disclosure relates to a user mobile communications device. The user mobile communications device comprises a transmitter circuit configured to transmit a communications signal to a serving RAN. The user mobile communications device also comprises a receiver circuit configured to receive communications signals from the serving RAN. The user mobile communications device also comprises a processor circuit communicatively coupled to the transmitter circuit and the receiver circuit. The processor circuit configured to determine one or more frequency ranges to scan to discover one or more neighbor radio access systems to the serving RAN based on scan frequency criteria that does not comprise a pre-known transmission frequency for the one or more neighbor radio access systems. The processor circuit is also configured to control the receiver circuit to discover the presence of the one or more neighbor radio access systems to the serving RAN based on receiving the communications signals over the one or more frequency ranges transmitted by the one or more neighbor radio access systems. The receiver circuit is further configured to discover the presence of the communications signals over the one or more frequency ranges.

An additional embodiment of the disclosure relates to a method of discovering neighbor radio access systems to a serving RAN serving one or more user mobile communications devices, the serving RAN comprising a serving cell. The serving cell communicates a scan frequency criteria that does not comprise a pre-known transmission frequency for the one or more neighbor radio access systems to cause the user mobile communications device to discover one or more neighbor radio access systems transmitting communications signals that satisfy the scan frequency criteria.

An additional embodiment of the disclosure relates to a serving cell in a serving RAN. The serving cell comprises a transmitter circuit configured to transmit a communications signal to a user mobile communications device. The serving cell also comprises a receiver circuit configured to receive communications signals from the user mobile communications device. The serving cell also comprises a processor circuit communicatively coupled to the transmitter circuit and the receiver circuit. The processor circuit is configured to control the transmitter circuit to transmit a communications signal comprising a scan frequency criteria that does not comprise a pre-known transmission frequency for one or more neighbor radio access systems to cause the user mobile communications device to discover one or more neighbor radio access systems transmitting communications signals that satisfy the scan frequency criteria.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 6A-6D are exemplary Third Generation Partnership Project (3GPP) message objects that can be modified and be employed by the user mobile communications device in the mobile telecommunications environment in FIGS. 1-2B for a serving RAN to provide the scan frequency criteria to communicate to a user mobile communications device to be used to discover neighbor RANs;

FIGS. 7A-7C are exemplary alternative 3GPP message objects that can be modified and be employed by the user communications device in the mobile telecommunications environment in FIGS. 1-2B to report discovery of neighbor RANs;

DETAILED DESCRIPTION

Figure 1:
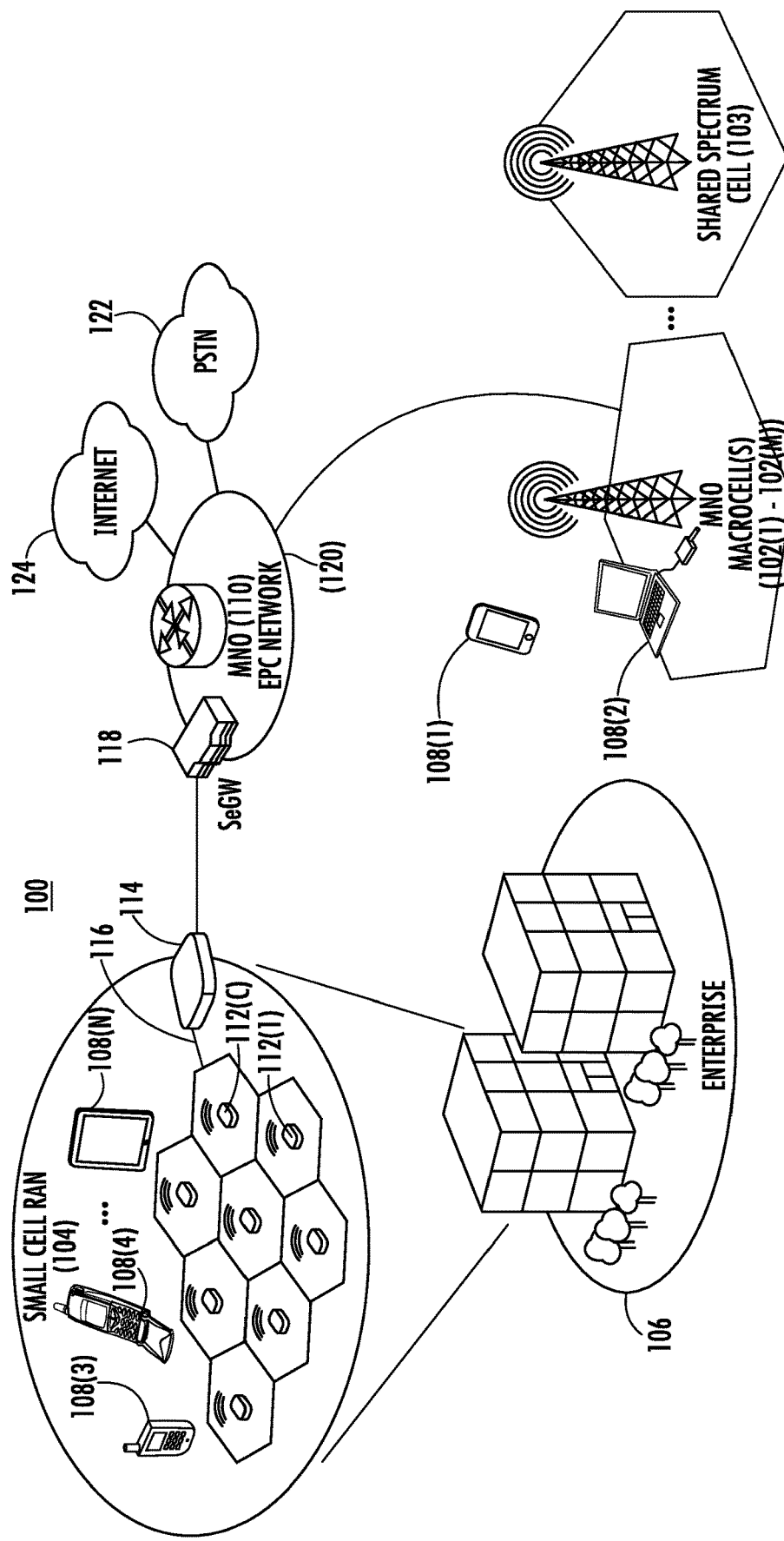
FIG. 1 is a schematic diagram of an exemplary mobile telecommunications environment that includes an exemplary macrocell radio access network (RAN) and an exemplary small cell RAN located within an enterprise environment and configured to service mobile communications between a user mobile communications device to a mobile network operator (MNO), wherein the user mobile communications device is configured to discover neighbor radio access systems to be reported a serving RAN.

Embodiments of the disclosure relate to discovery of neighbor radio access systems by a user mobile communications device serviced by a radio access network (RAN) for reporting discovered systems to the serving RAN. In this regard, in aspects disclosed herein, a user mobile communications device serviced by a serving RAN is configured to tune its receiver to scan one or more frequency ranges (e.g., bands) based on a scan frequency criteria to discover other neighbor radio access systems in communications range of the user mobile communications device. This is opposed to, for example, the user mobile communications device only searching for transmitted communications signals at specific center frequency, such as for example, using a specific Evolved Universal Terrestrial Radio Access (E-UTRA) Absolute Radio Frequency Channel Number (EARFCN). In this example, the scan frequency criteria does not include solely a pre-known transmission frequency for the one or more neighbor radio access systems. However, note that frequency range based on the scan frequency criteria can include a center transmission frequency (e.g., an EARFCN) of a neighbor radio access system, but is not solely comprised of a center transmission frequency of a neighbor radio access system. For example, the user mobile communications device may be a mobile cellular telephone that is configured to be serviced by a serving system (e.g., a eNodeB cell) in the RAN serving the user mobile communications device ("serving RAN"). The serving RAN may be operated by a mobile network operation (MNO). There may be other radio access systems, such as shared spectrum systems, that operate neighbor cells and in other frequency bands to the serving RAN. For example, such radio access systems may communicate over publicly available frequencies that are unlicensed, such as the citizens broadband radio service (CBRS). These radio access systems may be operated by third parties that are not MNOs. Thus, for example, because the MNOs may be unaware of the specific center frequencies used by these radio access systems, the serving system in the serving RAN may be unaware of what specific frequencies to point the user mobile communications device to discover. In this regard, in aspects disclosed herein, the user mobile communications device can be configured to scan a target frequency band(s) that is less deterministic than a single specific frequency. The target frequency band(s) can be based on based on a scan frequency criteria that includes, for example, a group of EARFCNs, a frequency band, a frequency range, and target band identification (ID) (e.g., a public land mobile network (PLMN) identification (ID) (PLMN ID)) as non-limiting examples. Any neighbor radio access systems discovered by the user mobile communications device according to the scanned frequency band(s) can be reported by the user mobile communications device to the serving system in the serving RAN in a measurement report (e.g., Measurement Report Messages (MRMs)), which can then be used by the serving system to indicate, point out, and/or determine systems and frequencies in the pertinent area. For example, the serving system may use the measurement report information to determine if other RANs of higher priority exist. As an example, measurement reports from the user mobile communications device can be used by the serving RAN to trigger handovers or to gather information about a neighbor radio access system.

As an example, the user mobile communications device may be configured to scan for other RANs in an idle or active communications mode, but only communicate a measurement report to the serving system in an active communications mode. In the active communications mode, measurement report information can be delivered, for example, in a user mobile communications device-specific radio resource control (RRC) signaling messages, and in particular in RRC messages that indicate to the user mobile communications device the appropriate measurement configuration parameters.

In some aspects disclosed herein, the serving system in the serving RAN to the user mobile communications device transmits a measurement configuration message comprising scan frequency criteria to the user mobile communications device used by the user mobile communications device to scan one or more frequency ranges to discover other neighbor radio access systems. In this manner, the user mobile communications device is instructed by the serving system in the serving RAN to scan a frequency range for other neighbor radio access systems rather than doing so unsolicitedly. However, in other aspects, the user mobile communications device may be configured to scan particular frequency ranges to find other neighbor radio access systems in an unsolicited manner without first being instructed through a measurement configuration message from a serving system. The frequency range scanned by the user mobile communications device can be based on a predefined policy programmed in the user mobile communications device. For example, the user mobile communications device may be programmed to scan frequencies in the CBRS band. The user mobile communications device may be configured to unsolicitedly scan for neighbor RANs in an idle communications mode. Subsequently, in either case of solicited or unsolicited scanning, the user mobile communications device can send the measurement reports regarding discovered neighbor radio access systems to the serving RAN to be processed.

In other aspects disclosed herein, the user mobile communications device may apply defined filtering criteria to the frequency band(s) to scan for neighbor radio access systems. In this manner, for example, the entire width of the frequency band(s) to scan does not have to be scanned, to conserve communications resources and reduce latency. A tradeoff can be determined based on the benefit of a more narrow or lower granularity scanning of frequencies in a frequency band versus the usefulness of the additional information obtained by scanning the frequency band at a lower granularity. For example, on certain frequency sub ranges within the frequency band to be scanned may be scanned by the user mobile communications device. As another example, the user mobile communications device can be configured to check the identification (e.g., the PLMN ID) of communications signals discovered within the scanned frequency range to then either include or filter out such discovered radio access systems in the measurement report provided back to the serving RAN.

In yet another aspect disclosed herein, the serving RAN can instruct different sets of serviced user mobile communications devices to perform different types of scanning. For example, the serving RAN may instruct one set of user mobile communications devices to scan for communications signals in larger frequency bands and report the results in measurement reports back to the serving RAN. The serving RAN may then use the measurement reports from the user mobile communications device for larger frequency band scanning to then instruct other user mobile communications device to scan for smaller frequency ranges within discovered frequency ranges reported as having discovered systems and/or at specific frequencies within the discovered frequency ranges.

In this regard, FIG. 1 is a schematic diagram of an exemplary mobile telecommunications environment 100 (also referred to as "environment 100") that includes exemplary macrocell radio access networks (RANs) 102(1)-102(M) ("macrocells 102(1)-102(M)") and an exemplary small cell RAN 104 located within an enterprise environment 106 and configured to service mobile communications between a user mobile communications device 108(1)-108(N) to a mobile network operator (MNO) 110. As discussed above and in more detail below, the user mobile communications devices 108(1)-108(N) can be configured to discover neighbor radio access systems to be reported to a serving RAN. A serving RAN for a user mobile communications devices 108(1)-108(N) is a RAN or cell in the RAN in which the user mobile communications devices 108(1)-108(N) have an established communications session with the exchange of mobile communications signals for mobile communications. Thus, a serving RAN may also be referred to herein as a serving cell. For example, the user mobile communications devices 108(3)-108(N) in FIG. 1 are being serviced by the small cell RAN 104, whereas user mobile communications devices 108(1) and 108(2) are being serviced by the macrocell 102. The macrocell 102 is a mobile network operation (MNO) macrocell in this example. However, a shared spectrum RAN 103 (also referred to as "shared spectrum cell 103") includes a macrocell in this example and supports communications on frequencies that are not solely licensed to a particular MNO and thus may service user mobile communications devices 108(1)-108(N) independent of a particular MNO. For example, the shared spectrum cell 103 may be operated by a third party that is not an MNO and wherein the shared spectrum cell 103 support citizens broadband radio service (CBRS). Also, as shown in FIG. 1, the MNO macrocell 102, the shared spectrum cell 103, and the small cell RAN 104 may be neighboring radio access systems to each other, meaning that some or all can be in proximity to each other such that a user mobile communications device 108(3)-108(N) may be able to be in communications range of two or more of the MNO macrocell 102, the shared spectrum cell 103, and the small cell RAN 104 depending on the location of user mobile communications devices 108(3)-108(N).

A general principle in environment 100 is that a serving RAN (e.g., an eNB in such system) provides a measurement configuration to the user mobile communications devices 108(1)-108(N) to "point" the receiver of the user mobile communications device 108(1)-108(N) to find other systems (e.g., neighbor cells) transmitting at a specified frequency (ies) (e.g., at 1900 MHz, 2500 MHz) according to the measurement configuration that the user mobile communications device 108(1)-108(N) should measure. The measurement of communications signals of other RANs by the user mobile communications device 108(1)-108(N) at specified frequencies is performed for a variety of purposes, including inter-frequency mobility and inter-frequency measurements. The user mobile communications devices 108(1)-108(N) can find these communications systems and perform actions, such as cell selection in the idle mode and sending of measurement reports (e.g., Measurement Report Messages (MRMs)) in the active mode. These measurement reports can be used by the serving RAN (e.g., MNO macrocell 102, shared spectrum cell 103, small cell RAN 104) to, for example, trigger handovers or to gather information about neighbor cells through Automatic Neighbor Relation (ANR) discovery. For example, the MNO macrocell 102 may use the MRMs for cell reselection to cause a user mobile communications device 108(1)-108(N) to be serviced by a different cell controlled by the MNO, such as the small cell RAN 104 for example, for optimizing communications. In idle mode, this measurement report information is delivered in a System Information broadcast, which is used by the MNO macrocell 102 to indicate, point out, and/or determine systems and frequencies in the pertinent area. This measurement report information is delivered in user mobile communications device-specific radio resource control signaling messages to serviced user mobile communications devices 108(1)-108(N) that indicate to the user mobile the appropriate measurement configuration parameters. In these measurement configuration parameters, there are specific instructions about what frequencies the serviced user mobile communications device 108(1)-108(N) should measure. The information measured by the user mobile communications devices 108(1)-108(N) is then reported back to the serving RAN. For example, the MNO macrocell 102 as a serving RAN may use the measurement report information to determine if other systems of higher priority exist.

In this regard, with continuing reference to FIG. 1, the user mobile communications device 108(1) is shown being serviced by the MNO macrocell 102. However, the user mobile communications device 108(1) may be in communications range of the shared spectrum cell 103. As another example, the user mobile communications device 108(3) shown being serviced by the small cell RAN 104 in FIG. 1 may also be in communications range of the MNO macrocell 102 and/or the shared spectrum cell 103. As an example, the MNO macrocell 102 may be unaware of the frequency bands used by the other neighbor RANs, such as the shared spectrum cell 103. Thus, the MNO macrocell 102 as the serving RAN to the user mobile communications device 108(3) may be unaware of what specific frequencies to point the user mobile communications device 108(3) to for discovery. In this regard, as an example, the user mobile communications devices 108(1)-108(N) serviced by their respective serving RANs may be configured to tune its receiver to scan one or more frequency ranges (e.g., bands) based on a scan frequency criteria to discover other neighbor radio access systems in communications range of the user mobile communications device 108(1)-108(N). In this example, the scan frequency criteria does not include solely a pre-known transmission frequency for the one or more neighbor radio access systems. However, note that frequency range based on the scan frequency criteria can include a center transmission frequency (e.g., an EARFCN) of a neighbor radio access system, but is not solely comprised of a center transmission frequency of a neighbor radio access system. This is opposed to, for example, the user mobile communications device 108(1)-108(N) only searching for transmitted communications signals at specific center frequency, such as for example, using a specific Evolved Universal Terrestrial Radio Access (E-UTRA) Absolute Radio Frequency Channel Number (EARFCN). Any neighbor radio access systems discovered by the user mobile communications device 108(1)-108(N) according to the scanned frequency band(s) can be reported to its serving RAN in a measurement report. Before discussing more exemplary aspects of a user mobile communications device 108(1)-108(N) that is configured to scan one or more frequency ranges (e.g., bands) based on a scan frequency criteria to discover other neighbor radio access systems in communications range of the user mobile communications device 108(1)-108(N), the environment 100 in regard to FIGS. 1-2B is first discussed below.

In this regard, with reference to FIG. 1, the mobile telecommunications environment 100 in this example, is arranged as an LTE (Long Term Evolution) system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 100 includes the enterprise 106 in which the small cell RAN 104 is implemented. The small cell RAN 104 includes a plurality of small cell radio nodes (RNs) 112(1)-112(C). Each small cell radio node 112(1)-112(C) has a radio coverage area (graphically depicted in the drawings as a hexagonal shape) that is commonly termed a "small cell." A small cell may also be referred to as a femtocell, or using terminology defined by 3GPP as a Home Evolved Node B (HeNB). In the description that follows, the term "cell" typically means the combination of a radio node and its radio coverage area unless otherwise indicated.

The size of the enterprise 106 and the number of cells deployed in the small cell RAN 104 may vary. In typical implementations, the enterprise 106 can be from 50,000 to 500,000 square feet and encompass multiple floors, and the small cell RAN 104 may support hundreds to thousands of users using mobile communications platforms such as mobile phones, smartphones, tablet computing devices, and the like shown as the user mobile communications devices 108(3)-108(N). However, the foregoing is intended to be illustrative and the solutions described herein can be typically expected to be readily scalable either upwards or downwards as the needs of a particular usage scenario demand.

In FIG. 1, the small cell RAN 104 includes one or more services nodes (represented as a single services node 114 in FIG. 1) that manage and control the small cell radio nodes 112(1)-112(C). In alternative implementations, the management and control functionality may be incorporated into a radio node, distributed among nodes, or implemented remotely (i.e., using infrastructure external to the small cell RAN 104). The small cell radio nodes 112(1)-112(C) are coupled to the services node 114 over a direct or local area network (LAN) connection 116 as an example typically using secure IPsec tunnels. The services node 114 aggregates voice and data traffic from the small cell radio nodes 112(1)-112(C) and provides connectivity over an IPsec tunnel to a security gateway (SeGW) 118 in an Evolved Packet Core (EPC) 120 network of the MNO 110. The EPC 120 is typically configured to communicate with a public switched telephone network (PSTN) 122 to carry circuit-switched traffic, as well as for communicating with an external packet-switched network such as the Internet 124.

The environment 100 also generally includes Evolved Node B (eNB) base station, or "macrocell" 102. The radio coverage area of the macrocell 102 is typically much larger than that of a small cell where the extent of coverage often depends on the base station configuration and surrounding geography. Thus, a given user mobile communications device 108(3)-108(N) may achieve connectivity to the EPC network 120 through either a macrocell 102 or small cell radio node 112(1)-112(C) in the small cell RAN 104 in the environment 100.

Figure 2A:
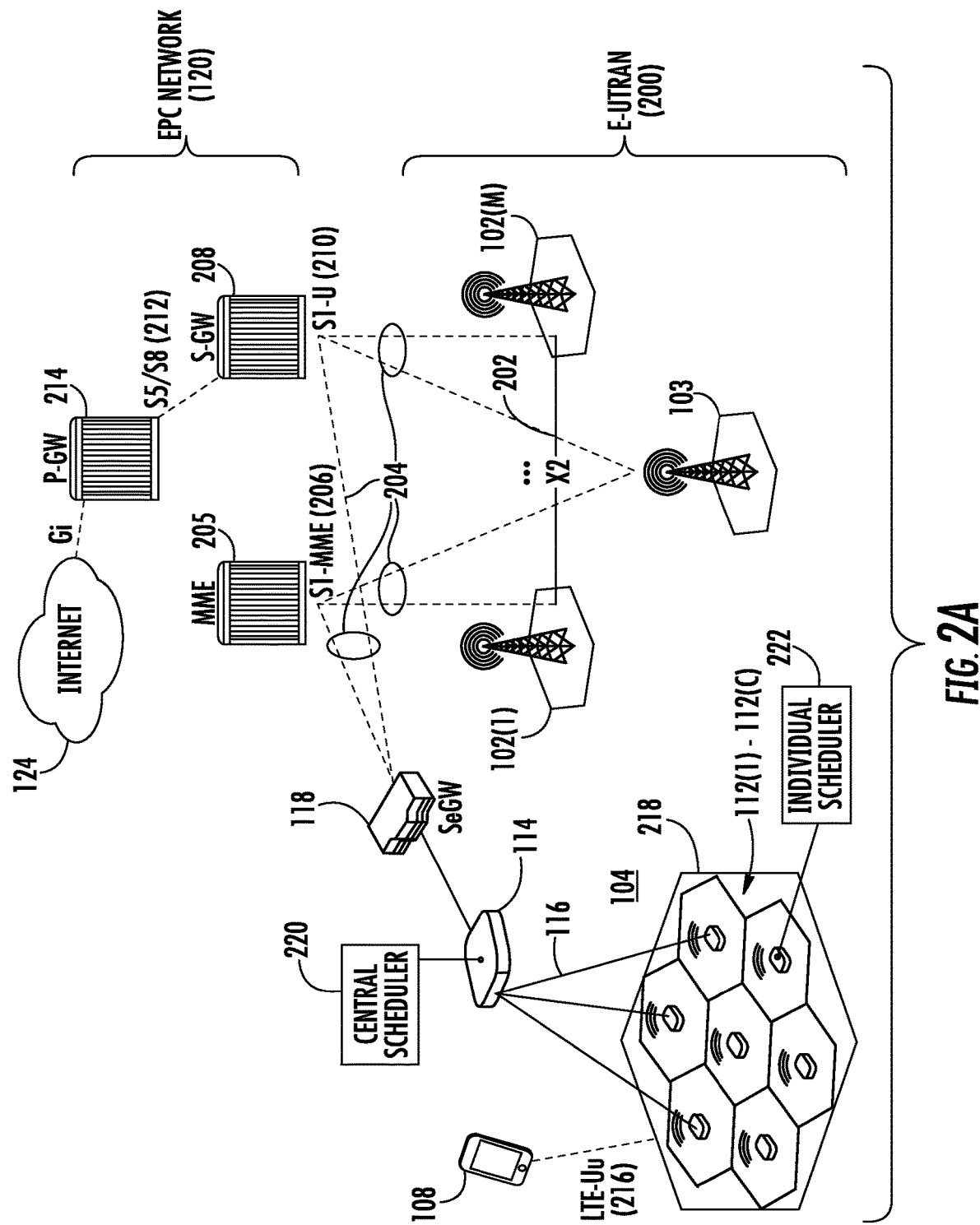
FIGS. 2A and 2B illustrate exemplary details of an evolved packet core (EPC) and Evolved Universal Mobile Telecommunications System (UMTS) Terrestrial Radio Access Network (E-UTRAN) arranged under LTE (Long Term Evolution) for the mobile telecommunications environment in FIG. 1.
Figure 2B:
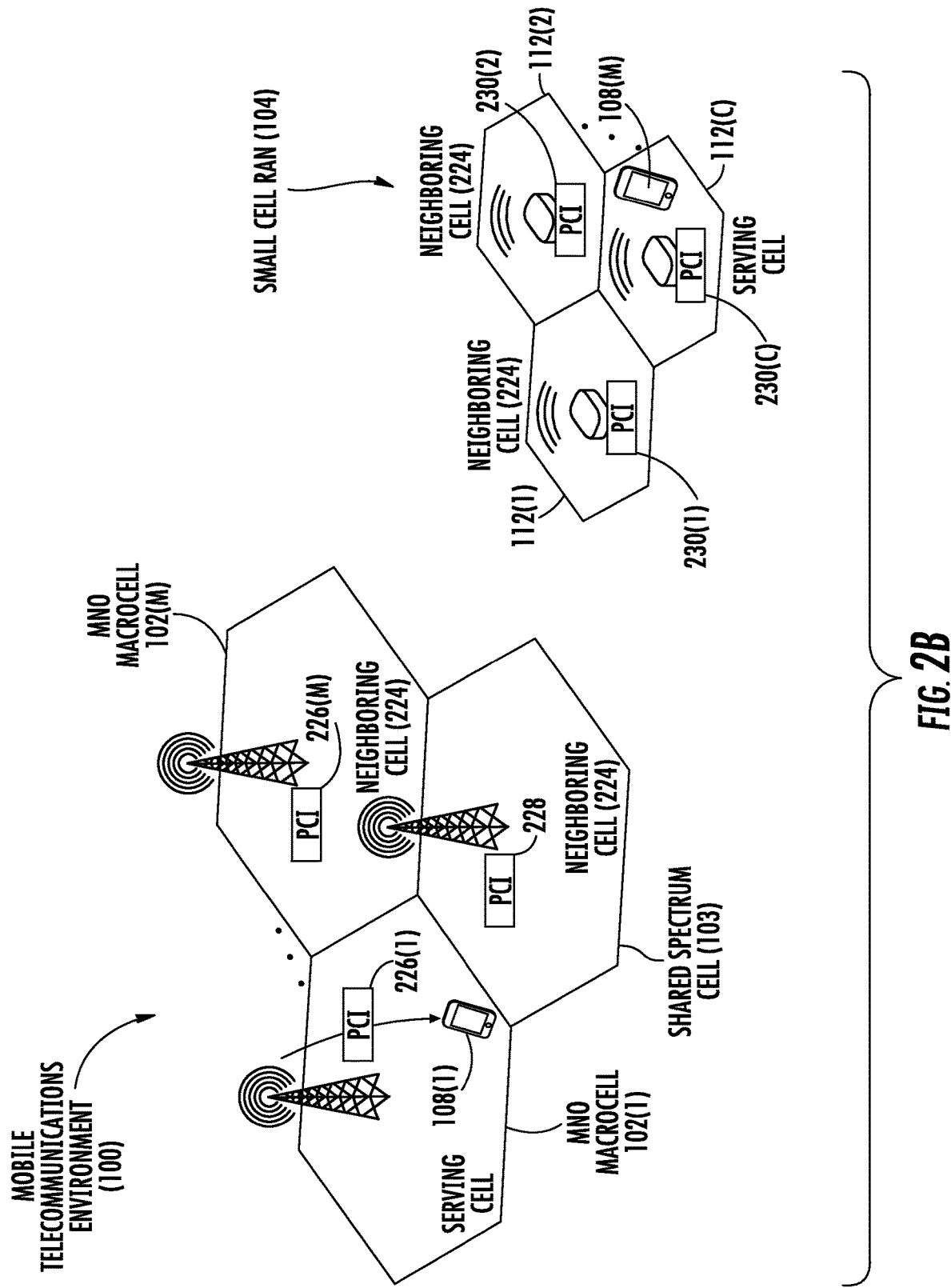

Along with macrocell 102, the small cell RAN 104 forms an access network (i.e., an Evolved UMTS Terrestrial Radio Access Network (E-UTRAN)) under 3GPP as represented by reference numeral 200 in FIG. 2A. As shown in FIG. 2A, there is no centralized controller in the E-UTRAN 200, hence an LTE network architecture is commonly said to be "flat." Macrocells 102(1)-102(M) are typically interconnected using an X2 interface 202. The shared spectrum cell 103 may or may not be interconnected to the macrocells 102(1)-102(M) through the X2 interface 202. The macrocells 102(1)-102(M) and shared spectrum cell 103 are also typically connected to the EPC network 120 by means of an S1 interface 204. More particularly, the macrocells 102(1)-102(M) and the shared spectrum cell 103 are connected to a Mobility Management Entity (MME) 205 in the EPC network 120 using an S1-MME interface 206, and to a Serving Gateway (S-GW) 208 using an S1-U interface 210. An S5 interface 212 couples the S-GW 208 to a Packet Data Network Gateway (P-GW) 214 in the EPC network 120 to provide the user mobile communications devices 108(1)-108(N) with connectivity to the Internet 124. A user mobile communications device 108(1)-108(N) can connect to the small cell radio nodes 112(1)-112(C) in the small cell RAN 104 over an LTE-Uu interface 216.

The S1-MME interface 206 is also connected to the MME 205 and S-GW 208 in the EPC network 120 using the appropriate S1 interface connections 204. Accordingly, as each of the small cell radio nodes 112(1)-112(C) in the small cell RAN 104 is operatively coupled to the services node 114 over the LAN connection 116, the communications connections from the small cell radio nodes 112(1)-112(C) are aggregated to the EPC network 120. Such aggregation preserves the flat characteristics of the LTE network while reducing the number of S1 interface connections 204 that would otherwise be presented to the EPC network 120. Thus, the small cell RAN 104 essentially appears as a single eNB 218 to the EPC network 120, as shown. The services node 114 in the small cell Ran 104 includes a central scheduler 220. The small cell radio nodes 112(1)-112(C) may also be configured to support individual schedulers 222.

A user mobile communications device 108 connected to the environment 100 will actively or passively monitor a cell in a macrocell 102(1)-102(M) in the E-UTRAN 200 in the communications range of the user mobile communications device 108 as the user mobile communications device 108 moves throughout the environment 100. As shown in FIG. 2B, such a cell is termed the "serving cell." For example, if user mobile communications device 108 is in communication through an established communications session with a particular small cell radio node 112(1)-112(C) in the small cell RAN 104, the particular small cell radio node 112(1)-112(C) will be the serving cell to the user mobile communications device 108, and the small cell RAN 104 will be the serving RAN. The user mobile communications device 108 will continually evaluate the quality of a serving cell as compared with that of a neighboring cell 224 in the small cell RAN 104, MNO macrocells 102, and/or the shared spectrum cell 103, as shown in FIG. 2B. A neighbor cell 224 is a cell among the small cell RAN 104, MNO macrocells 102, and/or the shared spectrum cell 103 that is not in control of the active communications session for a given user mobile communications device 108, but is located in proximity to a serving cell to a user mobile communications device 108 such that the user mobile communications device 108 could be in communications range of both its serving cell and the neighbor cell 224. Both small cell radio nodes 112(1)-112(C), the macrocells 102(1)-102(M), the shared spectrum cell 103 can identify themselves to a user mobile communications device 108 using a respective unique Physical Cell Identity (PCI) 226(1)-226(M), 228, 230(1)-230(C) (e.g., a public land mobile network (PLMN) identification (ID) (PLMN ID)) that is transmitted over a downlink user mobile communications device 108. Each of the small cell radio nodes 112(1)-112(C), the MNO macrocells 102(1)-102(M), and the shared spectrum cell 103 can assign a physical channel identity (PCI) that allows user mobile communications device 108 to distinguish adjacent cells. As such, the PCIs 226(1)-226(M), 228, 230(1)-230(C) are uniquely assigned among neighboring cells 224, but can be reused across geographically separated cells.

As discussed above, a general principle in the E-UTRAN 200 in FIGS. 1-2B is that a serving RAN (e.g., an eNB in such system) provides a measurement configuration to the user mobile communications devices 108(1)-108(N) to "point" the receiver of the user mobile communications device 108(1)-108(N) to find other neighbor cells 224 transmitting at a specified frequency(ies) (e.g., at 1900 MHz, 2500 MHz) according to the measurement configuration that the user mobile communications device 108(1)-108(N) should measure. However, new mobile access systems are capable of supporting spectrums independent of an MNO, such as the shared spectrum cell 103 in FIGS. 1-2B. For example, the shared spectrum cell 103 may support spectrum that includes unlicensed spectrum, shared spectrum, spectrum licensed from a third party, and/or spectrum associated with citizens broadband radio service (CBRS), and so on. In these cases, spectrum allocation, or channel allocation, may be assigned for the shared spectrum cell 103 by a technique or procedures that occur independently of the MNO that controls the MNO macrocells 102(1)-102(M), such as Spectrum Allocation System (SAS) for example. As an example, if the shared spectrum cell 103 were CBRS system operated in a stadium or arena by a third party, such shared spectrum cell 103 may be dynamically assigned a channel by a SAS. Due to this independent and dynamic nature of spectrum allocation, it would be very difficult for all surrounding MNO macrocells 102(1)-102(M) to be constantly aware of all the actual frequencies in which the shared spectrum cell 103 was allocated and operated on. However, if the third party has a business agreement with an MNO, the shared spectrum cell 103 may be configured to serve user mobile communications devices 108(1)-108(N) associated with a specific MNO or a specific set of MNOs supported by the MNO macrocells 102(1)-102(M). In so doing, the shared spectrum cell 103 is broadcasting the PCIs 226(1)-226(M) of the associated MNO macrocells 102(1)-102(M) to enable connections to user mobile communications devices 108(1)-108(N). Even with the business relationship between the MNOs of the MNO macrocells 102(1)-102(M) and the operator of the shared spectrum cell 103, the MNOs may be completely unaware of the specific frequencies allocated by the SAS to the shared spectrum cell 103 for communications. Even if the third party was made aware of such frequency allocation, this allocation may change dynamically due to steps taken by the shared spectrum cell 103 SASs for frequency optimization or other purposes. Thus, it is difficult and undesirable for the shared spectrum cell 103 to update each MNO with a list of employed, allocated frequencies. Such updating would create undesired operational coupling between the shared spectrum cell 103 and the MNO macrocells 102(1)-102(M).

In this regard, aspects disclosed herein include the ability of the user mobile communications device 108(1)-108(N) to discover of neighbor radio access systems, such shared spectrum cell 103, and reporting of such discovered radio access systems to a serving RAN, such the MNO macrocell 102 or a small cell radio node 112(1)-112(C) in the small cell RAN 104. In this regard, as discussed in more detail below, a user mobile communications device 108(1)-108(N) serviced by a serving RAN is configured to tune its receiver to scan one or more frequency ranges (e.g., bands) based on a scan frequency criteria to discover other neighbor cells 224 in communications range of the user mobile communications device 108(1)-108(N). This is opposed to, for example, the user mobile communications device only searching for transmitted communications signals at specific center frequency, such as for example, using a specific Evolved Universal Terrestrial Radio Access (E-UTRA) Absolute Radio Frequency Channel Number (EARFCN). Thus, in this example, the scan frequency criteria does not include solely a pre-known transmission frequency for the one or more neighbor radio access systems. Note that the frequency range based on the scan frequency criteria can include a center transmission frequency (e.g., an EARFCN) of neighbor cells 224, but is not solely comprised of the center transmission frequency of the neighbor cells 224. The user mobile communications device 108(1)-108(N) can, for example, be configured to scan a target frequency band(s) that is less deterministic than a single specific frequency. The target frequency band(s) can be based on based on a scan frequency criteria that includes, for example, a group of EARFCNs, a frequency band, a frequency range, and target band identification (ID) (e.g., a public land mobile network (PLMN) identification (ID) (PLMN ID)) as non-limiting examples. Any neighbor cells 224 discovered by the user mobile communications device 108(1)-108(N) according to the scanned frequency band(s) can be reported by the user mobile communications device 108(1)-108(N) to the serving RAN in a measurement report (e.g., Measurement Report Messages (MRMs)), which can then be used by the serving RAN to indicate, point out, and/or determine systems and frequencies in the pertinent area. For example, the serving RAN may use the measurement report information to determine if other RANs of higher priority exist. As an example, measurement reports from the user mobile communications device 108(1)-108(N) can be used by the serving RAN to trigger handovers or to gather information about a neighbor cell 224.

Figure 3:
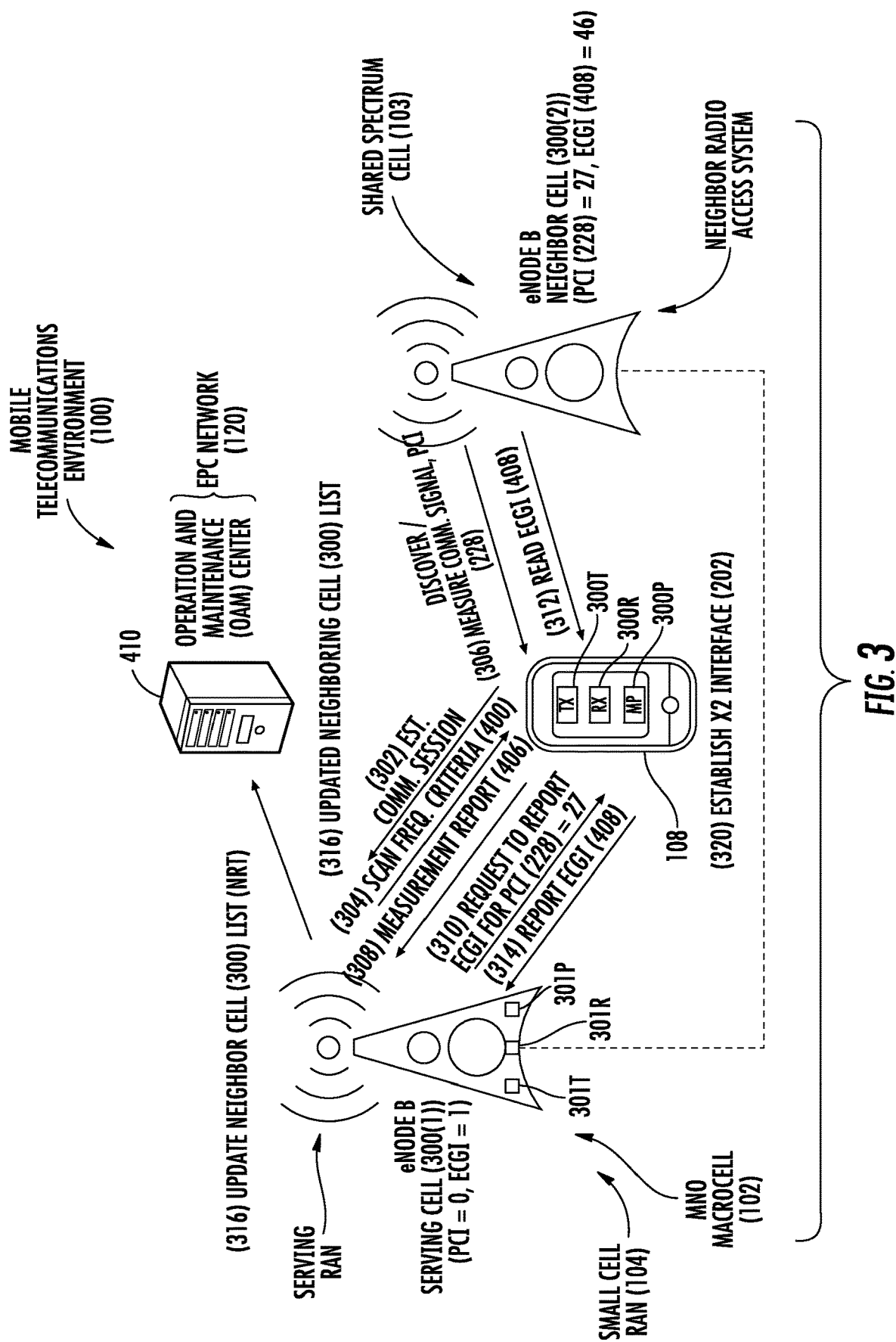
FIG. 3 is a diagram illustrating an exemplary neighbor radio access system discovery process that can be performed by a user mobile communications device in the E-UTRAN in FIGS. 2A and 2B to scan and measure communications signals at a specified frequency band(s), as opposed to single center frequency, to discover neighbor radio access systems, and report the measurements in a measurement report communicated to the serving RAN.
Figure 4:
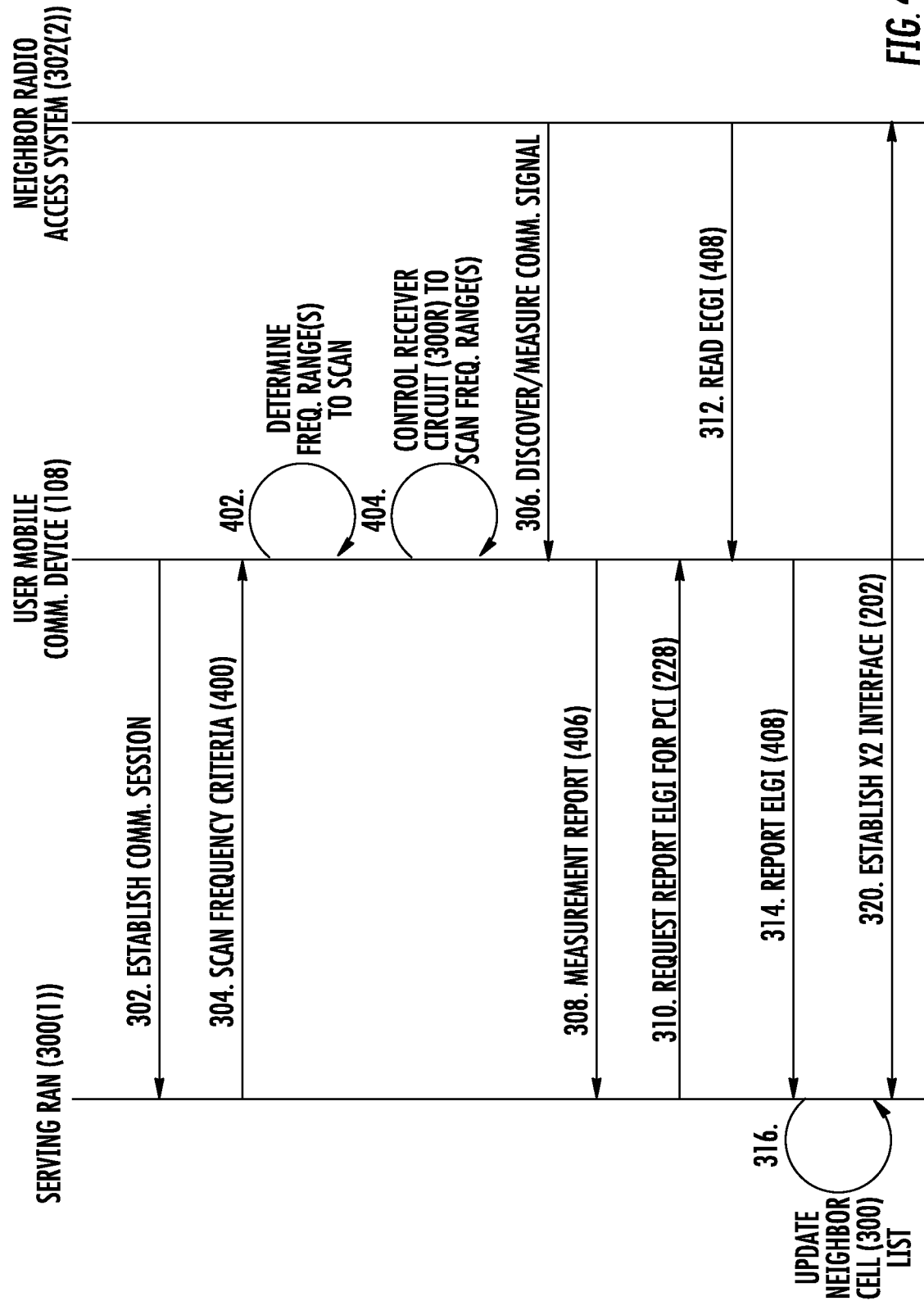
FIG. 4 is a flow diagram illustrating exemplary discovery process performed by a user mobile communications device serviced by a serving RAN in the E-UTRAN in FIGS. 2A and 2B to scan and measure communications signals at a specified frequency band(s), and report the measurements in a measurement report communicated to the serving RAN.

In this regard, FIG. 3 is a diagram illustrating the mobile telecommunications environment 100 in FIGS. 1-2B and illustrating an exemplary radio access system discovery process that can be performed by a user mobile communications device 108(1)-108(N) in the E-UTRAN 200 therein to scan and measure communications signals at a specified frequency band(s), as opposed to single center frequency, to discover neighbor cells 224. Note that the process that can be performed by a user mobile communications device 108(1)-108(N) in the E-UTRAN 200 therein to scan and measure communications signals at a specified frequency band(s) does not have to be performed as part of a radio access system discovery process, but is shown in FIG. 3 for exemplary illustrative purposes only. FIG. 4 is a flow diagram illustrating an exemplary discovery process performed by a user mobile communications device 108(1)-108(N) serviced by a serving RAN in the E-UTRAN 200 in FIG. 2 to scan and measure communications signals at a specified frequency band(s), and report the measurements in a measurement report communicated to the serving RAN. Any discovered neighbor cells 224 are reported by the user mobile communications device 108(1)-108(N) as measurements in a measurement report communicated to the serving RAN. The example in FIG. 3 assumes that a MNO macrocell 102 is a serving RAN to a user mobile communications device 108(1)-108(N), and the MNO macrocell 102 and shared spectrum cell 103 are respective neighbor cells 224(1), 224(2) to each other. FIGS. 3 and 4 will be discussed in conjunction with each other.

With reference to FIGS. 3 and 4, the user mobile communications device 108 includes a transmitter circuit 300T configured to transmit a communications signal to a serving RAN, such as the MNO macrocell 102 or small cell RAN 104, to establish a communications session with the serving RAN. The user mobile communications device 108(1) also includes a receiver circuit 300R configured to receive communications signals from the serving RAN for the communications session. The user mobile communications device 108(1) also includes a processor circuit 300P communicatively coupled to the transmitter circuit 300T and the receiver circuit 300R. The processor circuit 300P is configured to control the transmitter circuit 300T to transmit communications signals and control the receiver circuit 300R to receive communications signals in the desired frequency bands. The processor circuit 300P may also include other processing capabilities as will be described below.

With continuing reference to FIGS. 3 and 4, the user mobile communications device 108 may have established a previous communications session with a serving RAN as a first neighbor cell 300(1), which is the MNO macrocell 102 or small cell RAN 104 in this example to put the user mobile communications device 108 in an active mode (block 302). Note however that the user mobile communications device 108 can be in idle mode and does not have to first establish a communications session. In this example, a processor circuit 301P in the serving RAN causes a transmitter circuit 301T to communicate one or more scan frequency criteria 400 in a soliciting manner to the user mobile communications device 108 to be used to scan for neighbor cells 300, such as the shared spectrum cell 103 (block 304). For example, the scan frequency criteria 400 may be included in a measurement configuration message communicated from the serving RAN to the user mobile communications device 108 in this example (block 304). Note however that the user mobile communications device 108 may have access to scan frequency criteria without such being communicated first from the serving RAN, and/or having been communicated from the serving RAN to the user mobile communications device 108 already in the past. In an idle mode, a user mobile communications device 108 may be configured to receive the measurement related information for the scan frequency criteria 400 in radio resource control (RRC) signaling, such as system information broadcast message, such as System Information Broadcast Clock 5 for example. The system information broadcast could comprise an E-UTRA SIB 5 message for example. The user mobile communications device 108 may also be configured to receive the measurement related information for the scan frequency criteria 400 in radio resource control (RRC) signaling, such as a unicast message. In active mode, the user mobile communications device 108 may be configured to receive specific control messages that include measurement related information containing the scan frequency criteria 400 in RRC signaling, such as RRC Connection Setup or RRC Connection Reconfiguration, as discussed in more detail below, carrying measurement configuration information for the user mobile communications device 108. Instead of this message containing only specific EARFCNs to measure, the message would be now extended with the ability to point the user mobile communications device 108 into a spectrum range comprising multiple EARFCNs. As discussed above, the more scan frequency criteria 400 is not a particular center frequency for a known radio access system, because the serving RAN may not know of the presence of other third party radio access systems, such as the shared spectrum cell 103.

In this regard, as shown in FIG. 4, the user mobile communications device 108 determines one or more frequency ranges to scan to discover neighbor radio access systems to the serving RAN based on scan frequency criteria for which a center transmission frequency is not known (block 402). For example, the scan frequency criteria 400 is not an EARFCN. The processor circuit 300P of the user mobile communications device 108 then controls its receiver circuit 300R to scan for the presence of communications signals over one or more frequency ranges based on the received scan frequency criteria 400 (block 404). The user mobile communications device 108 can scan in either idle or active modes as an example. With reference to FIGS. 3 and 4, the processor circuit 300P of the user mobile communications device 108 discovers the presence of one or more neighbor radio access systems, such as the shared spectrum cell 103, to the serving RAN based on receiving communications signals over one or more frequency ranges transmitted by the one or more neighbor radio access systems (block 306). The processor circuit 300P of the user mobile communications device 108 then controls its transmitter circuit 300T to send a communications signal that includes measurement report 406 to report the discovery of one or more neighbor radio access systems to the serving RAN in response to discovering the presence of transmitted communications signals in the one or more frequency ranges by one or more neighbor radio access systems (block 308). The receiver circuit 301R of the serving RAN is configured to receive the communications signal that includes measurement report that includes the measurement report 406. For example, the measurement report may be a measurement report message (MRM). As an example, the user mobile communications device 108 may be configured to send the measurement report in a RRC signaling between the serving RAN and the user mobile communications device 108 in response to discovering the presence of transmitted communications signals in the one or more frequency ranges by the one or more neighbor radio access systems. The PCI 228 of a discovered neighbor cell 300(2) may be included in the measurement report 406 to be used by the serving RAN to identify the discovered neighbor cell 300(2).

With continuing reference to FIGS. 3 and 4, the processor circuit 301P of the serving RAN may then control its transmitter circuit 301T to communicate a communications signal that includes a request for the user mobile communications device 108 to report the E-UTRAN global cell identifier (EGCI) 408 for example, for the PCI 304 (block 310). In response, the processor circuit 300P of the user mobile communications device 108 controls its receiver circuit 300R to receive the ECGI 408 from the discovered neighbor cell 300(2) (block 312). The processor circuit 300P of the user mobile communications device 108 controls its transmitter circuit 300T to transmit the received ECGI 408 from the discovered neighbor cell 300(2) to the serving RAN (block 314). The processor circuit 301P of the serving RAN can then update a neighbor cell 300 list (NRT) (block 316), which can then be stored in an operation and maintenance (OAM) center 410 in the EPC network 120 (block 318). The processor circuit 301P of the serving RAN can then cause an X2 interface 202 to be established with the discovered neighbor cell 300(2) as a neighbor radio access system (block 320). For example, the X2 interface 202 can be used to deliver inter-cell interference cancellation (ICIC) messages to coordinate which RAN about the serving RAN and the discovered neighbor cell 300(2) will be the new serving RAN for the user mobile communications device 108.

The user mobile communications device 108 can perform one or more mobility related functions related to discovery of the one or more shared spectrum discovered neighbor cells 300(2). For example, when handover occurs between a serving MNO macrocell 102 and the neighbor cell 300(2), the serving MNO macrocell 102 has to determine if there is a neighbor cell 300(2) that is strong enough for it to initiate handover for the user mobile communications device 108. Thus, the discovery of the neighbor cell 300(2) by the user mobile communications device 108 based on the scan frequency criteria 400 can trigger measurements of the same. The user mobile communications device 108 can provide measurement reports of the discovered neighbor cell 300(2) to provide such reports to the serving RAN and for the user mobile communications device 108 to be able to perform other mobility related procedures. Examples of such mobility related procedures can include the user mobile communications device 108 performing cell reselection, a network reselection, a PLMN selection, and/or an idle mode mobility procedure.

As an example, the scan frequency criteria 400 used by the user mobile communications device 108 to determine the frequency range or ranges to scan for neighbor cells 300 band identification (band ID) that provides a band frequency range for a particular type of communication system or service to discover can be provided in many different forms. As another example, the scan frequency criteria 400 could be one of more frequency ranges based on a center frequency range. As another example, the scan frequency criteria 400 could be one or more frequency ranges based on a center frequency list. As another example, the scan frequency criteria 400 could be a target RAN type to discover, which can then be used by the user mobile communications device 108 to control the frequency range(s) to scan.

Alternatively, instead of the serving RAN being configured to transmit the frequency scan criteria 400 in a soliciting manner to the user mobile communications device 108 to be used to scan for neighbor cells 300, such as the shared spectrum cell 103 shown FIGS. 3 and 4 (block 304), the user mobile communications device 108 could scan for neighboring cells 300 in an unsolicited manner. In this regard, the step in block 304 in FIGS. 3 and 4 would not be present. The frequency range(s) scanned by the user mobile communications device 108 can be based on a predefined policy programmed in the user mobile communications device 108. For example, user mobile communications device 108 may be programmed to scan frequencies in one or more frequency bands for radio access systems that include, but are not limited to citizens broadband radio service (CBRS) radio access system, a MultiFire system, an unlicensed radio system, a band 48 radio access system, a 3.5 GHz radio access system, and a 5 GHz radio access system. The user mobile communications device 108 may be configured to unsolicitedly scan for neighbor cells 300 in an idle communications mode. Subsequently, the user mobile communications device 108 can send the measurement reports regarding discovered neighbor radio access systems to the serving RAN to be processed just as provided and described above in FIGS. 3 and 4.

Figure 5A:
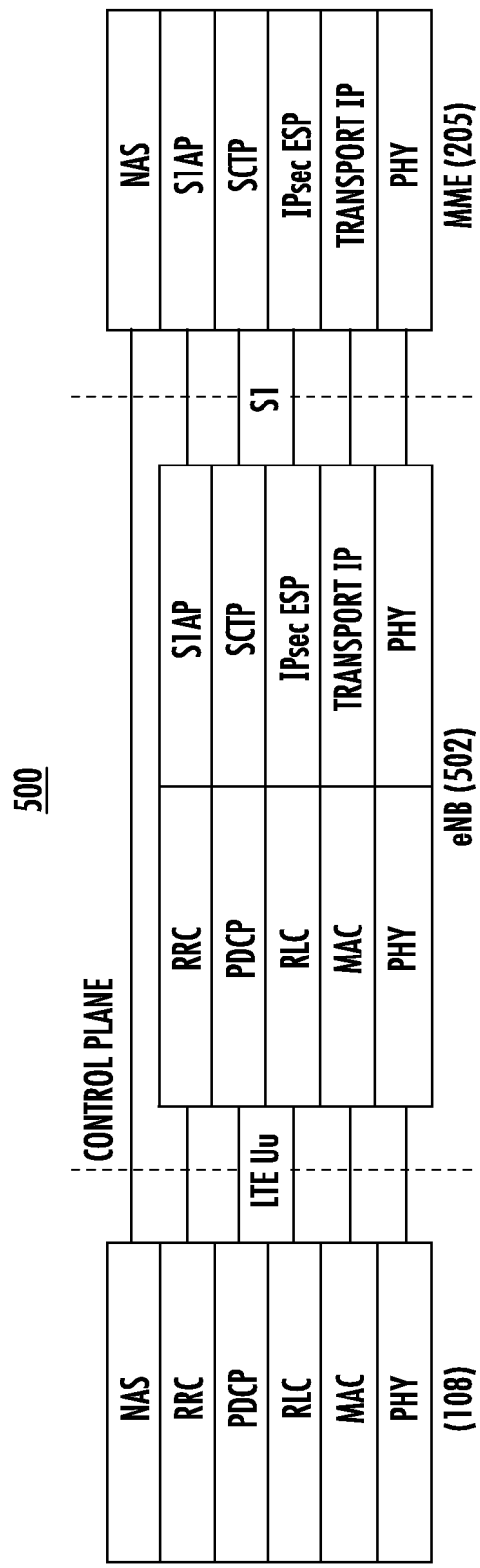
FIG. 5A illustrates an exemplary control plane protocol stack arranged in accordance with LTE and as modified to provide for a user mobile communications device to receive a measurement configuration message from an exemplary serving RAN in FIGS. 1-2B and to report the measurements in a measurement report communicated to the serving RAN.
Figure 5B:
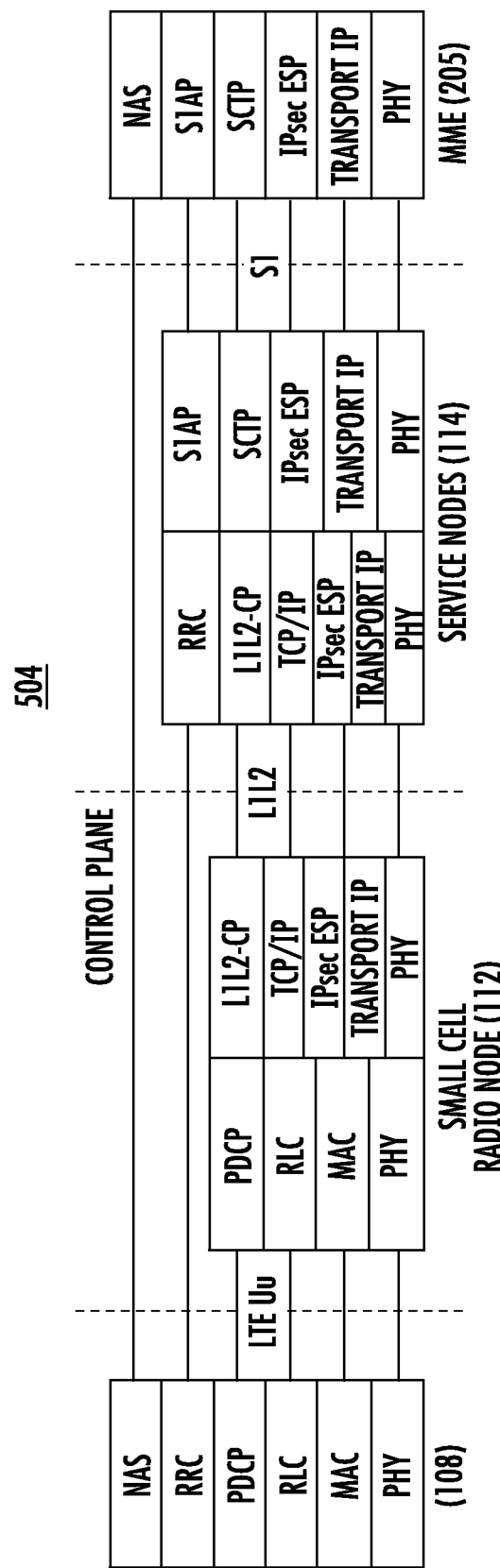
FIG. 5B illustrates an exemplary control plane protocol stack arranged in accordance with LTE and as modified to provide for a user mobile communications device to receive a measurement configuration message from an exemplary small cell RAN in FIGS. 1-2B and to report the measurements in a measurement report to a radio cell in the small cell RAN operatively coupled to a service node for aggregating the radio node mobile communications to the EPC.

FIG. 5A illustrates an exemplary control plane protocol stack 500 arranged in accordance with LTE and as modified to provide for a user mobile communications device 108 to receive a measurement configuration message from an exemplary serving RAN as an eNodeB 502 in the macrocell 102 in FIGS. 1-2B, and to report the measurements in a measurement report communicated to the serving RAN. The RRC layer that can be used for transporting the measurement report of discovered neighbor cells 300(2) from the user mobile communications devices 108 is terminated at the eNodeB 502. FIG. 5B illustrates an exemplary control plane protocol stack arranged 504 in accordance with LTE and as modified to provide for a user mobile communications device 108 to receive a measurement configuration message from an exemplary small cell RAN 104 in FIGS. 1-2B and to report the measurements in a measurement report to a radio cell in the small cell RAN 104 operatively coupled to a services node 114 for aggregating the radio node mobile communications to the EPC network 120. As shown in FIG. 5B, the services node 114 is transparently located between the small cell radio node 112 and the MME 205. Unlike the standard LTE control plane protocol stack 500 in FIG. 5A, the RRC layer is terminated at the services node 114 and not at the individual small cell radio node 112.

FIGS. 6A-6D are exemplary 3GPP messages that can be modified and be employed by the user mobile communications device 108(1)-108(N) in the mobile telecommunications environment 100 in FIGS. 1-2B to facilitate discovery of neighbor RANs. For example, as illustrated in FIG. 6A, the data structure shown for RRC Connection Reconfiguration message 600 is a command to modify an RRC connection between a user mobile communications device 108(1)-108(N) and a serving RAN to use RRC signaling messages for communication of scan frequency criteria 400. The RRC Connection Reconfiguration message object 600 can be used may convey information for measurement configuration, mobility control, radio resource configuration (including RBs, MAC main configuration, and physical channel configuration) including any associated dedicated NAS information and security configuration. For example, the information element MeasConfig 602 in FIG. 6A can be used to specify measurements to be performed by the user mobile communications device 108(1)-108(N), and covers intra-frequency, inter-frequency and inter-RAT mobility as well as configuration of measurement gaps. FIG. 6B illustrates more detail on the data structure of the information element MeasConfig 602 in FIG. 6A. The information element MeasObjectToAddModList 604 in the information element MeasConfig 602 concerns a list of measurement objects to add or modify, and thus could be used to provide the scan frequency criteria 400. FIG. 6C illustrates more detail on the data structure of the information element MeasObjectToAddModList 604 in FIG. 6B. The information element MeasObjectEUTRA 606 in the information element MeasObjectToAddModList 604 specifies information applicable for intra-frequency or inter-frequency E-UTRA cells. FIG. 6D illustrates more detail on the data structure of the information element MeasObjectEUTRA 606 in FIG. 6C. The information element ARFCN-ValueEUTRA 608 in the information element MeasObjectEUTRA 606 specifies information applicable for a carrier frequency for E-UTRA cells. As seen above from the RRC message RRC Connection Reconfiguration message 600 in FIG. 6A, it is possible to refer to only a specific EARFCN as the measurement target. But, to allow the RRC Connection Reconfiguration message object 600 in FIG. 6A to point to a frequency range containing multiple EARFCNs for example, the information element MeasObjectEUTRA 606 in the information element MeasObjectToAddModList 604 in FIG. 6C parameter can be updated with a parameter pointing to such a frequency range. For example, the added parameter could be a EARFCN List or EARFCN Range. Additional changes to the messages may also be required to extend the applicability to measurements that are not related to a single specific EARFCN. Its also possible that 3GPP would specify a new Measurement Object to address this new use case.

FIGS. 7A-7C are exemplary alternative 3GPP messages that can be modified and be employed by a user mobile communications device 108(1)-108(N) in the mobile telecommunications environment 100 in FIGS. 1-2A to report the discovery of neighbor RANs. FIG. 7A illustrates a MeasurementReport message object 700 used for the indication of measurement results of discovered serving RANs by a user mobile communications device 108(1)-108(N). The information element MeasResults 702 in the MeasurementReport message object 700 covers measured results for intra-frequency, inter-frequency, and inter-RAT mobility. FIG. 7B illustrates more detail of information element MeasResults 702 in FIG. 7A. The information element MeasResults 702 can be used to identify a measurement configuration, i.e., linking of a measurement object and a reporting configuration. The information element MeasResults 702 includes an information element MeasId 704 that is used to identify a measurement configuration, i.e., linking of a measurement object and a reporting configuration. FIG. 7C illustrates more detail on the contents of the information element MeasId 704 in FIG. 7B. As can be seen in FIGS. 7A and 7B, each information element MeasResults 702 is tied to a preconfigured information element MeasId 704. As shown in FIG. 7C, information element MeasId 704 is an integer value 706 given to the user mobile communications devices 108(1)-108(N) in a preceding RRC signaling (MeasObjectId, see FIG. 6D). To report unsolicited measurement results, information on how these measurements are identified by the user mobile communications devices 108(1)-108 (N) to the serving RAN may need to be provided. For example, a completely new type of measurement results information element (similar to information element MeasResults 702) may be specified for this purpose. Alternatively, a predefined value for the information element MeasId 704 could be specified that is to be used for these unsolicited measurement results. Also, additional information in the information element MeasResults 70 may be employed due to the different type of measurements, which could be added to the RRC signaling to convey all necessary information to the network.

Figure 8:
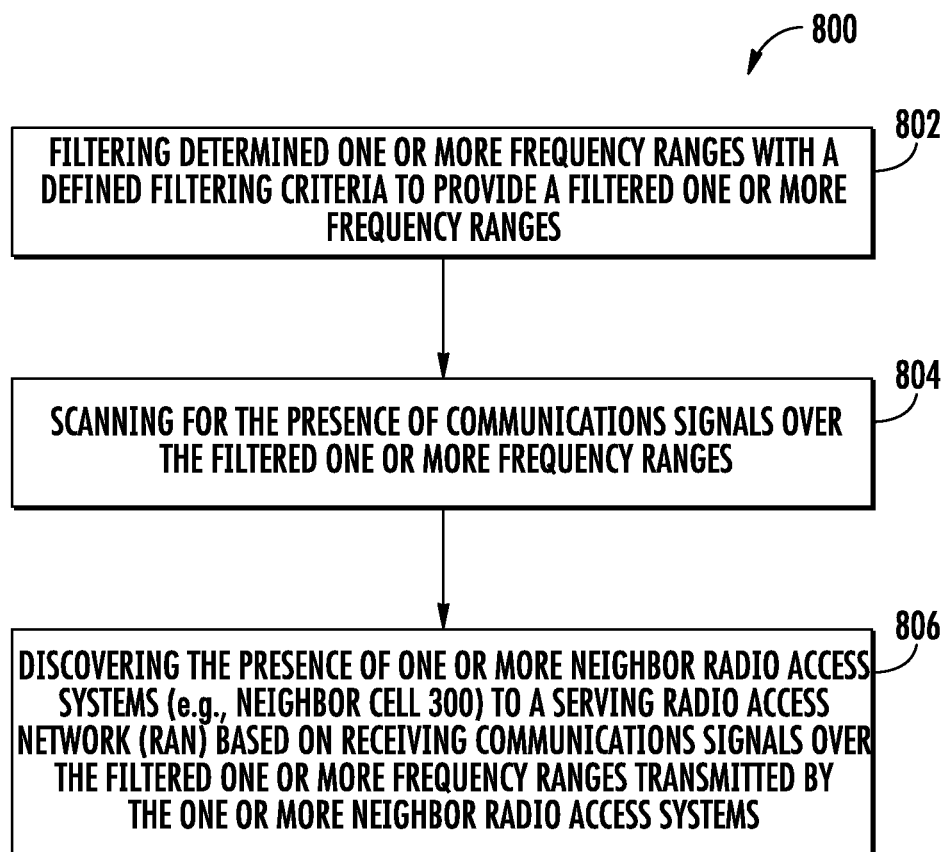
FIG. 8 is a flowchart illustrating an exemplary process employed by user mobile communications devices to filter the scan frequency criteria to determine the frequency range(s) to scan.

The user mobile communications devices 108(1)-108(N) may also be configured to further to filter the scan filtering criteria 400 to determine the frequency range(s) to scan to discover neighbor cells 300. In this regard, FIG. 8 is a flowchart illustrating an exemplary process 800 for user mobile communications devices 108(1)-108(N) to filter the scan filtering criteria 400 to determine the frequency range(s) to scan for discovering neighbor cells 300. The process 800 comprises filtering the determined one or more frequency ranges with a defined filtering criteria to provide a filtered one or more frequency ranges (block 802). The process 800 also includes scanning for the presence of communications signals over the filtered one or more frequency ranges (block 804). The process 800 also comprises discovering the presence of one or more neighbor radio access systems (e.g., neighbor cell 300) to the serving RAN based on receiving communications signals over the filtered one or more frequency ranges transmitted by the one or more neighbor radio access systems (block 806). For example, the filtered one or more frequency ranges can include one or more subsets of narrower frequency ranges of the scanning for the presence of communications signals over the one or more subsets of narrower frequency ranges, and then discovering the presence of one or more neighbor cells 300 to the serving RAN based on receiving communications signals over the one or more subsets of narrower frequency ranges transmitted by the one or more neighbor cells 300. The reporting the discovery of one or more neighbor cells 300 can include reporting the filtered discovered one or more neighbor radio access systems to the serving RAN in response to discovering the presence of transmitted communications signals in the one or more frequency ranges by the filtered one or more neighbor cell 300. For example, the frequency ranges to scan for the frequency ranges can based on a PLMN, NHN_ID, and/or a provider service identifier (PSID) of the discovered one or more neighbor cells 300.

Figure 9:
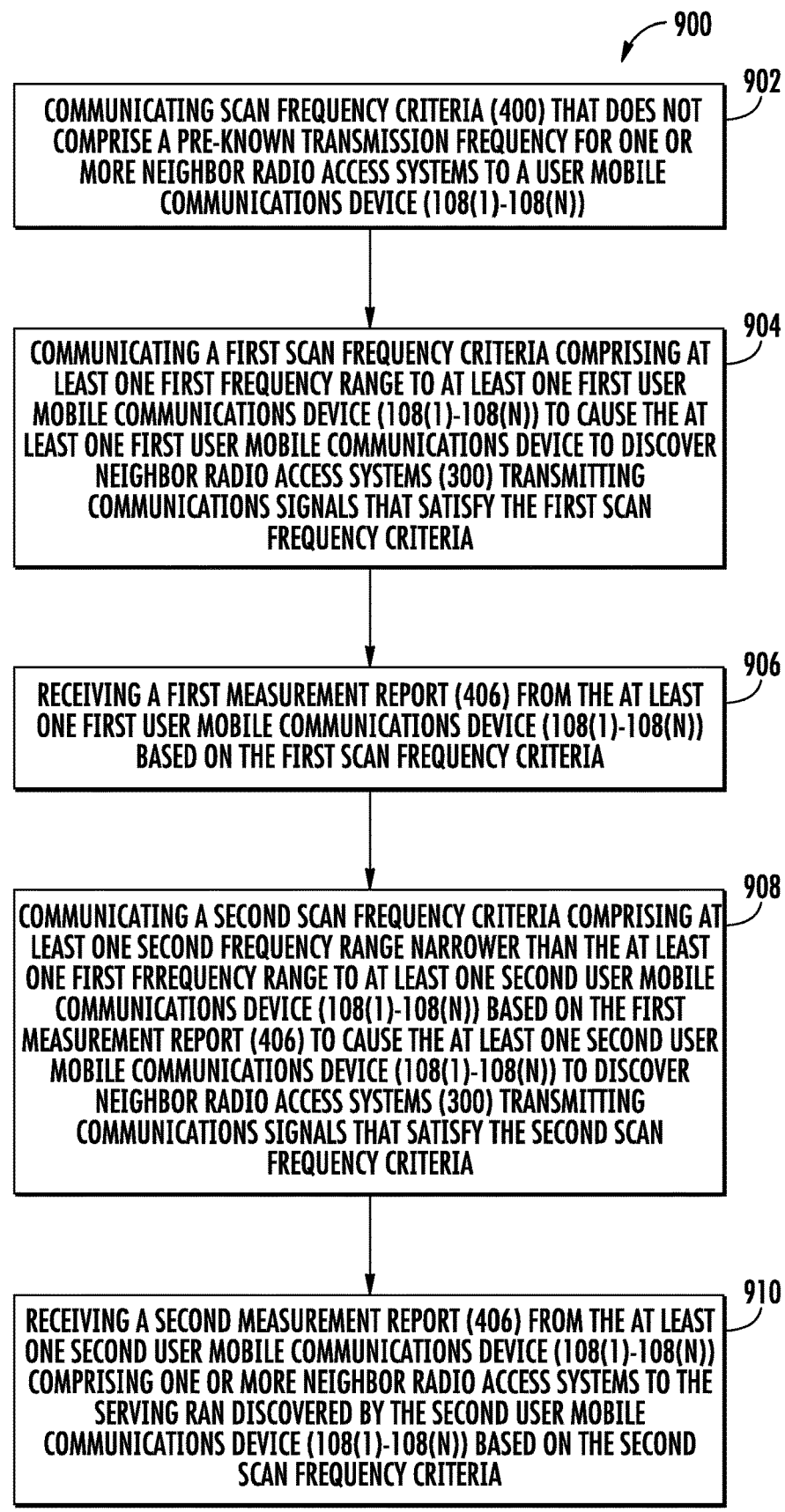
FIG. 9 is a flow diagram illustrating an exemplary process of a serving RAN directing multiple user mobile communications devices with scan frequency criteria for a first user mobile communications device(s) to scan broader frequency range(s) for neighboring cells, and a second user mobile communications device(s) to scan broader frequency range(s) within the broader frequency range(s) where neighboring cells may have been discovered.

Also, different user mobile communications devices 108 (1)-108(N) in FIGS. 1A-2 can be employed and instructed by a serving RAN to discover a neighbor cell 300. For example, FIG. 9 is a flowchart illustrating an exemplary process 900 a serving RAN in FIGS. 1A-2 directing user mobile communications devices 108(1)-108(N) with scan filtering criteria for a first user mobile communications device(s) 108(1)-108(N) to scan broader frequency range(s) for neighboring cells 300, and a second user mobile communications device(s) 108(1)-108(N) to scan broader frequency range(s) within the broader frequency range(s) where neighboring cells 300 may have been discovered. As shown therein, the process 900 involves the serving RAN communicating the scan frequency criteria for which the center transmission frequency is not known to the user mobile communications device 108(1)-108(N) (block 902). The process 900 also involves the serving RAN communicating a first scan frequency criteria comprising at least one first frequency range to at least one first user mobile communications device 108(1)-108(N) to cause the at least one first user mobile communications device to discover neighbor radio access systems 300 transmitting communications signals that satisfy the first scan frequency criteria (block 904). The process 900 also includes the serving RAN receiving a first measurement report 406 from the at least one first user mobile communications device 108(1)-108(N) based on the first scan frequency criteria (block 906). The process 900 also includes communicating a second scan frequency criteria comprising at least one second frequency range narrower than the at least one first frequency range to at least one second user mobile communications device 108(1)-108(N) based on the first measurement report 406 to cause the at least one second user mobile communications device 108(1)-108(N) to discover neighbor radio access systems 300 transmitting communications signals that satisfy the second scan frequency criteria (block 908). The process 900 also involves the serving RAN receiving a second measurement report 406 from the at least one second user mobile communications device 108(1)-108(N) comprising one or more neighbor radio access systems to the serving RAN discovered by the second user mobile communications device 108(1)-108(N) based on the second scan frequency criteria (block 910).

Figure 10:
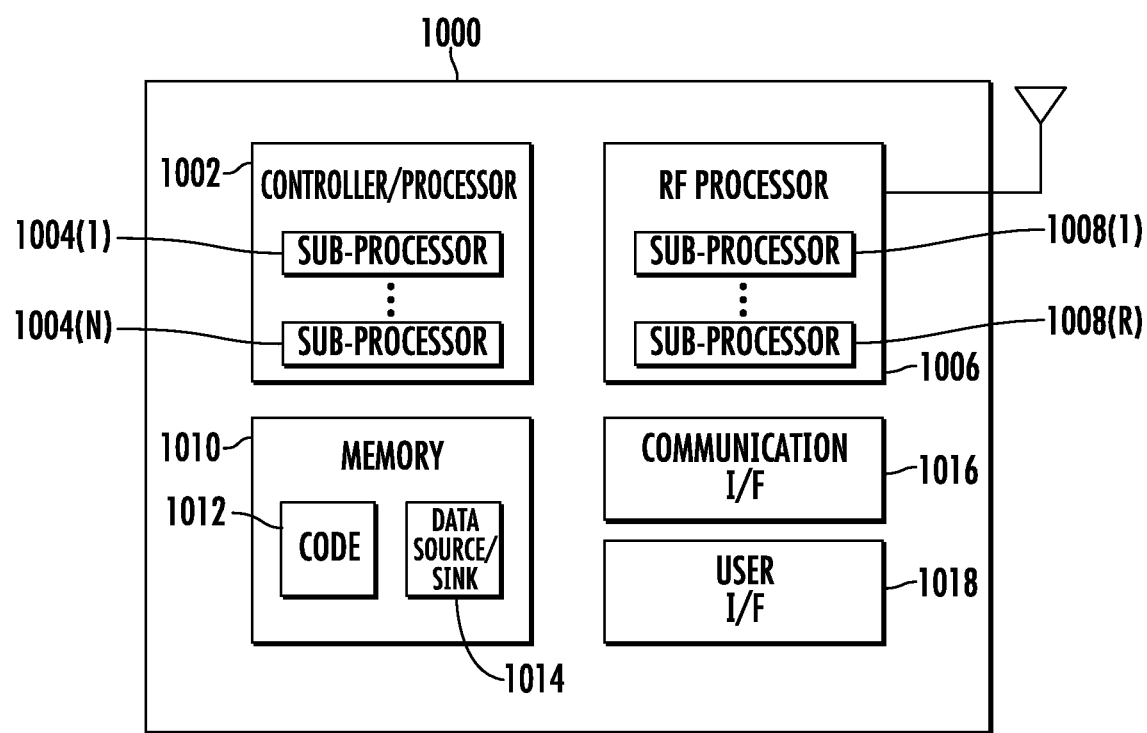
FIG. 10 is a schematic diagram of an exemplary computer system that can be implemented for a radio cell of a RAN or a user mobile communications device that may be configured to facilitate a discovery process involving scanning a frequency range(s) to discovery neighbor radio access systems, wherein the computer system is adapted to execute instructions from an exemplary computer readable link.

FIG. 10 shows a simplified functional block diagram 1000 of illustrative computer system for a radio cell as a serving cell in a serving RAN, including the macrocell 102(1)-102(M), shared spectrum cell 103, and/or small cell RAN 104, and/or a user mobile communications device 108 that may be utilized to facilitate the discovery of a neighbor radio access system or cells reporting to a serving RAN. A user mobile communications device serviced by a RAN is configured to scan one or more frequency ranges (e.g., bands) to discover other neighbor radio access systems. A controller/processor 1002 typically handles high level processing. The controller/processor 1002 may include one or more sub-processors 1004(1)-1004(N) or cores that are configured to handle specific tasks or functions. An RF processor 1006 implements various signal processing functions for the downlink including the lower level L1 processing. The RF processor 1006 may include one or more sub-processors 1008(1)-1008(R) or cores that are configured to handle specific tasks or functions. A memory 1010 is a computer-readable medium that stores computer-readable code 1012 that is executable by one or more processors including the controller/processor 1002 and/or the RF processor 1006. The memory 1010 may also include various data sources and data sinks (collectively represented by element 1014) that may provide additional functionalities.

The code 1012 in typical deployments is arranged to be executed by the one or more processors to facilitate the discovery of a neighbor radio access system or cells reporting to a serving RAN. The code 1012 additionally enables implementation of both the dedicated PCI identity and common PCI identity using the same hardware infrastructure in a given dual identity cell when executed. The hardware infrastructure may also include various interfaces (I/Fs) including a communication I/F 1016 which may be used, for example, to implement a link to the services node 114 (FIG. 1), LAN, or to an external processor, control, or data source. In some cases, a user I/F 1018 may be utilized to provide various indications such as power status or to enable some local control of features or settings. It is noted that the block diagram 1000 may also be substantially applicable to a services node 114, MNO macrocell 102, shared spectrum cell 103, small cell RAN 104 and/or the user mobile communications devices 108(1)-108(N). More particularly, the RF processor 1006 may be eliminated in some applications and any functionality that it provides that is needed to implement the services node 114 may be provided by the controller/processor 1002.

While the computer-readable medium is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium)

having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of discovering neighbor radio access systems to a serving radio access network (RAN) serving a user mobile communications device, the user mobile communications device:
    determining one or more frequency ranges to scan to discover one or more neighbor radio access systems to a serving RAN based on scan frequency criteria that does not comprise a pre-known transmission frequency for the one or more neighbor radio access systems; and
    discovering a presence of the one or more neighbor radio access systems to the serving RAN based on detecting scanned communications signals at one or more center frequencies within the one or more frequency ranges of the one or more neighbor radio access systems.

2. The method of claim 1, further comprising the user mobile communications device scanning for presence of communications signals within the one or more frequency ranges.

3. The method of claim 1, further comprising the user mobile communications device reporting the discovery of the one or more neighbor radio access systems to the serving RAN in response to discovering a presence of transmitted communications signals in the one or more frequency ranges at the one or more center frequencies of the one or more neighbor radio access systems.

4. The method of claim 3, further comprising:
filtering the discovered one or more neighbor radio access systems based on at least one radio access system filtering criteria to provide a filtered discovered one or more neighbor radio access systems; and
wherein reporting the discovered one or more neighbor radio access systems comprises reporting the filtered discovered one or more neighbor radio access systems to the serving RAN in response to discovering the presence of transmitted communications signals in the one or more frequency ranges by the filtered discovered one or more neighbor radio access systems.

5. The method of claim 4, further comprising receiving the at least one radio access system filtering criteria in a system information broadcast message from the serving RAN.

6. The method of claim 4, further comprising receiving the at least one radio access system filtering criteria in a user mobile communications device specific radio resource control signaling message from the serving RAN.

7. The method of claim 6, further comprising the serving RAN triggering a handover of a serviced user mobile communications device to a discovered neighbor radio access system among the discovered one or more neighbor radio access systems in response to receiving the reported discovery of the one or more neighbor radio access systems to the serving RAN from the user mobile communications device.

8. The method of claim 1, wherein the one or more frequency ranges is not an Evolved Universal Terrestrial Radio Access (E-UTRA) Absolute Radio Frequency Channel Number (EARFCN).

9. The method of claim 1, wherein the scan frequency criteria comprises a radio access systems band-identification (band ID).

10. The method of claim 1, wherein the scan frequency criteria comprises the one or more frequency ranges based on a center frequency range.

11. The method of claim 1, wherein the scan frequency criteria comprises a center frequency list.

12. The method of claim 1, further comprising receiving the scan frequency criteria in a system information broadcast message from the serving RAN.

13. The method of claim 1, further comprising receiving the scan frequency criteria in a user mobile communications device specific radio resource control signaling message from the serving RAN.

14. The method of claim 1, further comprising:
filtering the determined one or more frequency ranges with a defined filtering criteria to provide a filtered one or more frequency ranges; and
comprising:
scanning for presence of communications signals over the filtered one or more frequency ranges; and
discovering the presence of the one or more neighbor radio access systems to the serving RAN based on receiving the communications signals over the filtered one or more frequency ranges transmitted by the one or more neighbor radio access systems.

15. The method of claim 14, wherein the filtered one or more frequency ranges comprises one or more subsets of narrower frequency ranges of the one or more frequency ranges; and
comprising:
scanning for the presence of communications signals over the one or more subsets of narrower frequency ranges;
discovering the presence of the one or more neighbor radio access systems to the serving RAN based on receiving the communications signals over the one or more subsets of narrower frequency ranges transmitted by the one or more neighbor radio access systems.

16. The method of claim 1, wherein the scan frequency criteria that does not comprise the pre-known transmission frequency for the one or more neighbor radio access systems is preconfigured in the user mobile communications device.

17. The method of claim 1, wherein at least one of the one or more neighbor radio access systems comprises a radio access system comprised from the group consisting of a shared spectrum radio access system, a citizens broadband radio service (CBRS) radio access system, a MultiFire system, an unlicensed radio system, a band 48 radio access system, a 3.5 GHz radio access system, and a 5 GHz radio access system.

18. The method of claim 1, further comprising the user mobile communications device performing one or more mobility related functions related to the discovery of the one or more neighbor radio access systems.

19. The method of claim 18, wherein the one or more mobility related functions comprises at least one of a cell reselection, a network reselection, a public land mobile network (PLMN) selection, or idle mode mobility procedure.

20. A user mobile communications device, comprising:
a transmitter circuit configured to transmit a communications signal to a serving radio access network (RAN);
a receiver circuit configured to receive communications signals from the serving RAN;
a processor circuit communicatively coupled to the transmitter circuit and the receiver circuit, the processor circuit configured to:
determine one or more frequency ranges to scan to discover one or more neighbor radio access systems to the serving RAN based on scan frequency criteria that does not comprise a pre-known transmission frequency for the one or more neighbor radio access systems; and
control the receiver circuit to discover a presence of the one or more neighbor radio access systems to the serving RAN based on receiving the communications signals over the one or more frequency ranges transmitted by the one or more neighbor radio access systems;
wherein the receiver circuit is further configured to discover a presence of the communications signals over the one or more frequency ranges.

21. The user mobile communications device of claim 20, wherein the processor circuit is further configured to control the receiver circuit to scan the presence of the one or more neighbor radio access systems by controlling the receiver circuit to scan for the presence of the communications signals over the one or more frequency ranges.

22. The user mobile communications device of claim 20, wherein the processor circuit is configured to control the receiver circuit to discover the presence of the communications signals over the one or more frequency ranges in an idle mode.

23. The user mobile communications device of claim 20, wherein the processor circuit is configured to control the receiver circuit to discover the presence of the communications signals over the one or more frequency ranges in an active mode.

24. The user mobile communications device of claim 20, wherein the processor circuit is further configured to control the transmitter circuit to transmit a communications signal comprising a report message indicating the discovered one or more neighbor radio access systems to the serving RAN in response to the discovery of a presence of transmitted communications signals in the one or more frequency ranges by the one or more neighbor radio access systems.

25. The user mobile communications device of claim 24, wherein the processor circuit is configured to control the transmitter circuit to transmit the communications signal comprising a measurement report message (MRM) to the serving RAN in response to the discovery of a presence of the transmitted communications signals in the one or more frequency ranges by the one or neighbor radio access systems.

26. The user mobile communications device of claim 25, wherein the processor circuit is configured to control the transmitter circuit to transmit the report message indicating the discovered one or more neighbor radio access systems to the serving RAN comprises communicating the discovered one or more neighbor radio access systems to the serving RAN in a radio resource control (RRC) signal message in response to the discovery of the presence of transmitted communications signals in the one or more frequency ranges by the one or more neighbor radio access systems.

27. The user mobile communications device of claim 20, wherein the one or more frequency ranges is not an Evolved Universal Terrestrial Radio Access (E-UTRA) Absolute Radio Frequency Channel Number (EARFCN).

28. The user mobile communications device of claim 20, wherein the scan frequency criteria comprises a radio access systems band-identification (band ID).

29. The user mobile communications device of claim 20, wherein the scan frequency criteria comprises the one or more frequency ranges based on a center frequency range.

30. The user mobile communications device of claim 20, wherein the scan frequency criteria comprises a center frequency list.

31. The user mobile communications device of claim 20, wherein the scan frequency criteria comprises a target RAN type.

32. The user mobile communications device of claim 20, wherein the processor circuit is further configured to:
 filter the determined one or more frequency ranges with a defined filtering criteria to provide a filtered one or more frequency ranges;
 control the receiver circuit to discover the presence of the communications signals over the filtered one or more frequency ranges; and
 discover the presence of the one or more neighbor radio access systems to the serving RAN based on receiving the communications signals over the filtered one or more frequency ranges transmitted by the one or more neighbor radio access systems.

33. The user mobile communications device of claim 32, wherein the filtered one or more frequency ranges comprises one or more subsets of narrower frequency ranges of the one or more frequency ranges; and
 wherein the processor circuit is configured to:
  control the receiver circuit to discover the presence of the communications signals over the one or more subsets of narrower frequency ranges; and
  discover the presence of the one or more neighbor radio access systems to the serving RAN based on receiving the communications signals over the one or more subsets of narrower frequency ranges transmitted by the one or more neighbor radio access systems.

34. The user mobile communications device of claim 32, wherein the processor circuit is further configured to:
 filter the discovered one or more neighbor radio access systems based on at least one radio access system filtering criteria to provide filtered discovered one or more neighbor radio access systems; and
 control the transmitter circuit to transmit a communications signal comprising a report message indicating the discovered one or more neighbor radio access systems comprising reporting the filtered discovered one or more neighbor radio access systems to the serving RAN in response to discovering a presence of transmitted communications signals in the one or more frequency ranges by the filtered discovered one or more neighbor radio access systems.

35. The user mobile communications device of claim 34, wherein the processor circuit is configured to filter the discovered one or more neighbor radio access systems based on public land mobile network (PLMN) identifications (IDs) of the discovered one or more neighbor radio access systems to provide the filtered discovered one or more neighbor radio access systems.

36. A method of discovering neighbor radio access systems to a serving radio access network (RAN) serving one or more user mobile communications devices, the serving RAN comprising a serving cell, the serving cell:
 communicating a scan frequency criteria that does not comprise a pre-known transmission frequency for one or more neighbor radio access systems to cause a user mobile communications device to discover the one or more neighbor radio access systems transmitting communications signals that satisfy the scan frequency criteria.

37. The method of claim 36, further comprising receiving a measurement report from the user mobile communications device comprising the one or more neighbor radio access systems to the serving RAN discovered by the user mobile communications device based on the scan frequency criteria.

38. The method of claim 37, wherein:
 communicating the scan frequency criteria that does not comprise the pre-known transmission frequency for the one or more neighbor radio access systems comprises:
  communicating a first scan frequency criteria comprising at least one first frequency range to at least one first user mobile communications device to cause the at least one first user mobile communications device to discover the one or more neighbor radio access systems transmitting communications signals that satisfy the first scan frequency criteria;
 receiving the measurement report from the user mobile communications device comprises:
  receiving a first measurement report from the at least one first user mobile communications device based on the first scan frequency criteria; and communicating the scan frequency criteria further comprises:
  communicating a second scan frequency criteria comprising at least one second frequency range narrower than the at least one first frequency range to at least one second user mobile communications device based on the first measurement report to cause the at least one second user mobile communications device to discover the one or more neighbor radio access systems transmitting communications signals that satisfy the second scan frequency criteria.

39. The method of claim 36, further comprising the serving RAN communicating a user mobile communications device specific radio resource control signaling message comprising the scan frequency criteria to the user mobile communications device.

40. The method of claim 36, wherein the serving RAN communicating the scan frequency criteria to the user mobile communications device comprises communicating a system broadcast message comprising the scan frequency criteria to the user mobile communications device.

41. The method of claim 36, wherein the serving RAN communicating the scan frequency criteria to the user mobile communications device comprises communicating in a message configuration message, wherein the message configuration message comprises one of a radio resource control (RRC) connection setup message and an RRC connection reconfiguration message.

42. The method of claim 36, wherein at least one of the one or more neighbor radio access systems comprises a radio access system comprised from the group consisting of a citizens broadband radio service (CBRS) radio access system, a MultiFire system, an unlicensed radio system, a band 48 radio access system, a 3.5 GHz radio access system, and a 5 GHz radio access system.

43. A serving cell in a serving radio access network (RAN), comprising:
  a transmitter circuit configured to transmit a communications signal to a user mobile communications device;
  a receiver circuit configured to receive communications signals from the user mobile communications device; and
  a processor circuit communicatively coupled to the transmitter circuit and the receiver circuit, the processor circuit configured to:
    control the transmitter circuit to transmit the communications signal comprising a scan frequency criteria that does not comprise a pre-known transmission frequency for one or more neighbor radio access systems to cause the user mobile communications device to discover the one or more neighbor radio access systems transmitting communications signals that satisfy the scan frequency criteria.

44. The serving cell of claim 43, wherein the processor circuit is further configured to control the receiver circuit to receive a communications signal comprising a measurement report from the user mobile communications device comprising the one or more neighbor radio access systems to the serving RAN discovered by the user mobile communications device based on the scan frequency criteria.

45. The serving cell of claim 44, wherein the processor circuit is configured to control the transmitter circuit to transmit the communications signals to the user mobile communications device to trigger a handover of the user mobile communications device to a discovered neighbor radio access system among the discovered one or more neighbor radio access systems in response to the measurement report.

46. The serving cell of claim 43, wherein the processor circuit is configured to:
  control the transmitter circuit to transmit the communications signal comprising the scan frequency criteria by being configured to:
    transmit a communications signal comprising a first scan frequency criteria comprising at least one first frequency range to at least one first user mobile communications device to cause the at least one first user mobile communications device to discover the one or more neighbor radio access systems transmitting the communications signals that satisfy the first scan frequency criteria;
  control the receiver circuit to receive a communications signal comprising a first measurement report from the at least one first user mobile communications device based on the first scan frequency criteria; and
  the processor circuit further configured to:
    control the transmitter circuit to transmit a communications signal comprising a second scan frequency criteria comprising at least one second frequency range narrower than the at least one first frequency range to at least one second user mobile communications device based on the first measurement report to cause the at least one second user mobile communications device to discover one or more neighbor radio access systems transmitting the communications signals that satisfy the second scan frequency criteria; and
    control the receiver circuit to receive a communications signal comprising a second measurement report from the at least one second user mobile communications device comprising one or more neighbor radio access systems to the serving RAN discovered by the at least one second user mobile communications device based on the second scan frequency criteria.

* * * * *

UNITED STATES PATENT AND TRADEMARK OFFICE
CERTIFICATE OF CORRECTION

PATENT NO. : 10,764,798 B2
APPLICATION NO. : 15/815248
DATED : September 1, 2020
INVENTOR(S) : Kalle Ahmavaara and Hithesh Nama It is certified that error appears in the above-identified patent and that said Letters Patent is hereby corrected as shown below:

In the Specification

Column 23, Line 41, delete "distributed antenna"

Signed and Sealed this
Twenty-seventh Day of August, 2024

Katherine Kelly Vidal
*Director of the United States Patent and Trademark Office*